US007007106B1

(12) United States Patent
Flood et al.

(10) Patent No.: US 7,007,106 B1
(45) Date of Patent: *Feb. 28, 2006

(54) PROTOCOL AND METHOD FOR MULTI-CHASSIS CONFIGURABLE TIME SYNCHRONIZATION

(75) Inventors: Mark Flood, Mayfield Hts., OH (US); Anthony Cachat, Hudson, OH (US); Mark Ruetty, Brecksville, OH (US); Steven Zuponcic, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 875 days.

This patent is subject to a terminal disclaimer.

(21) Appl. No.: 09/862,256

(22) Filed: May 22, 2001

(51) Int. Cl.
*G06F 15/16* (2006.01)

(52) U.S. Cl. ............... 709/248; 713/1; 713/2; 713/100; 713/375; 713/400; 713/401; 713/500; 713/501; 713/502; 713/600; 713/601; 714/12; 714/789; 370/503; 370/504; 370/505; 370/506; 370/507; 370/508; 370/509; 370/510; 370/511; 370/512; 370/513; 370/514; 370/515; 370/516; 370/517; 370/518; 370/519; 370/520; 375/94

(58) Field of Classification Search .............. 713/1, 713/2, 100, 375, 400, 401, 500, 501, 502, 713/600, 601; 714/12, 789; 370/503–520; 702/89; 375/94; 709/248
See application file for complete search history.

(56) References Cited

U.S. PATENT DOCUMENTS

| 4,521,871 | A |   | 6/1985  | Galdum et al. |        |
|-----------|---|---|---------|---------------|--------|
| 4,829,297 | A |   | 5/1989  | Ilg et al.    |        |
| 4,876,664 | A |   | 10/1989 | Bittorf et al.|        |
| 4,937,777 | A |   | 6/1990  | Flood et al.  |        |
| 5,193,189 | A |   | 3/1993  | Flood et al.  |        |
| 5,287,548 | A |   | 2/1994  | Flood et al.  |        |
| 5,452,467 | A | * | 9/1995  | May et al. .................. 716/1 |
| 5,627,745 | A |   | 5/1997  | Flood         |        |
| 5,777,874 | A |   | 7/1998  | Flood et al.  |        |
| 5,912,814 | A |   | 6/1999  | Flood         |        |
| 5,933,347 | A |   | 8/1999  | Cook et al.   |        |
| 5,963,448 | A |   | 10/1999 | Flood et al.  |        |
| 5,966,300 | A |   | 10/1999 | Flood et al.  |        |
| 5,966,301 | A |   | 10/1999 | Cook et al.   |        |
| 5,966,304 | A |   | 10/1999 | Cook et al.   |        |
| 5,997,166 | A |   | 12/1999 | Flood         |        |
| 6,002,339 | A | * | 12/1999 | Norris ................... 340/690 |
| 6,453,424 | B1| * | 9/2002  | Janniello .............. 713/500 |
| 6,584,125 | B1| * | 6/2003  | Katto ................... 370/537 |
| 6,710,814 | B1| * | 3/2004  | Ueno et al. ............ 348/500 |

* cited by examiner

*Primary Examiner*—John Follansbee
*Assistant Examiner*—Ashok B. Patel
(74) *Attorney, Agent, or Firm*—Amin & Turocy LLP; R. Scott Speroff

(57) ABSTRACT

Systems and methods are disclosed for time synchronization of operations in a control system. Synchronization networks and devices are provided for transferring synchronization information between controllers in a distributed or localized control system, which is employed in order to allow operation of such controllers to be synchronized with respect to time. Also disclosed are synchronization protocols and hardware apparatus employed in synchronizing control operations in a control system.

29 Claims, 18 Drawing Sheets

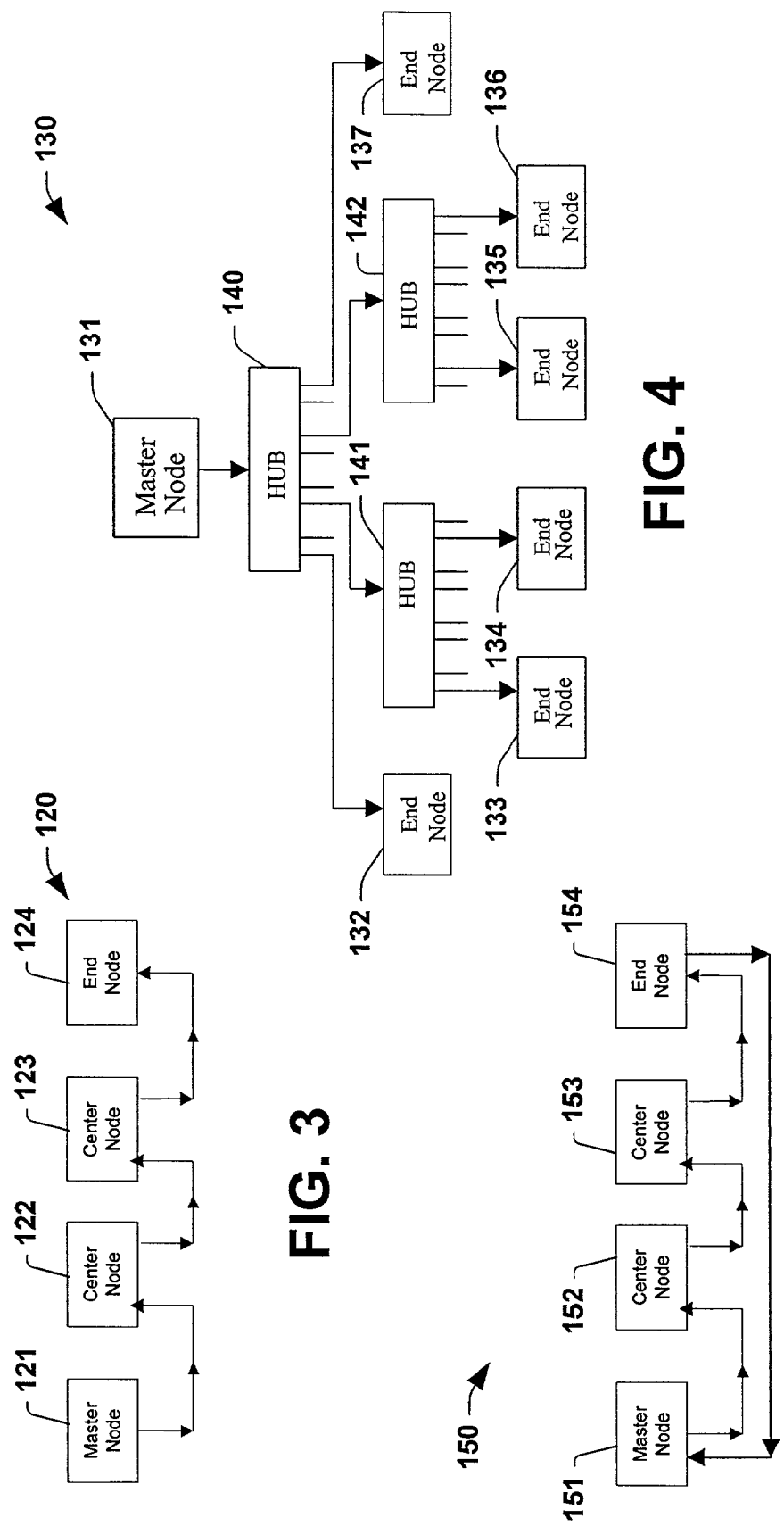

| Option Number | Number of Direct Data Words | Number of Multiplexed Words | Number of Remote Axis | Multiplex Time (usec.) |
|---|---|---|---|---|
| 0 | 0 | 0 | 0 | 0 |
| 1 | 0 | 0 | 2 | 250 |
| 2 | 0 | 14 | 1 | 250 |
| 3 | 0 | 28 | 0 | 250 |
| 4 | 1 | 9 | 1 | 250 |
| 5 | 1 | 23 | 0 | 250 |
| 6 | 2 | 4 | 1 | 250 |
| 7 | 2 | 18 | 0 | 250 |
| 8 | 3 | 13 | 0 | 250 |
| 9 | 4 | 8 | 0 | 250 |
| 10 | 2 | 2 | 2 | 500 |
| 11 | 2 | 16 | 1 | 500 |
| 12 | 2 | 30 | 0 | 500 |
| 13 | 3 | 0 | 2 | 500 |
| 14 | 3 | 14 | 1 | 500 |
| 15 | 3 | 28 | 0 | 500 |
| 16 | 4 | 4 | 1 | 500 |
| 17 | 4 | 18 | 0 | 500 |

| Package Data 1 | Package Data 2 | Package Data 3 | Package Data 4 | Package Data 5 | Direct Data 0 |

| Package Data 1 | Package Data 2 | Package Data 3 | Package Data 4 | Package Data 5 | Direct Data 0 |

| Package Data 1 | Package Data 2 | Package Data 3 | Package Data 4 | Direct Data 1 | Direct Data 0 |

| Package Data 1 | Package Data 2 | Package Data 3 | Package Data 4 | Direct Data 1 | Direct Data 0 | ← 237 |

FIG. 21

| Package Data 1 | Package Data 2 | Package Data 3 | Direct Data 2 | Direct Data 1 | Direct Data 0 | ← 238 |

FIG. 22

| Package Data 1 | Package Data 2 | Direct Data 3 | Direct Data 2 | Direct Data 1 | Direct Data 0 | ← 239 |

FIG. 23

| Package Data 1 | Package Data 2 | Package Data 3 | Package Data 4 | Direct Data 1 | Direct Data 0 |

| Package Data 1 | Package Data 2 | Package Data 3 | Package Data 4 | Direct Data 1 | Direct Data 0 |

| Package Data 1 | Package Data 2 | Package Data 3 | Package Data 4 | Direct Data 1 | Direct Data 0 |

| Package Data 1 | Package Data 2 | Direct Data 3 | Direct Data 2 | Direct Data 1 | Direct Data 0 |

| Package Data 1 | Package Data 2 | Direct Data 3 | Direct Data 2 | Direct Data 1 | Direct Data 0 |

PROTOCOL AND METHOD FOR MULTI-CHASSIS CONFIGURABLE TIME SYNCHRONIZATION

TECHNICAL FIELD

The present invention relates to the art of industrial controls and more particularly to protocols and methodologies for multi-chassis configurable time synchronization in a control system.

BACKGROUND OF THE INVENTION

Industrial controllers are special purpose processing devices used for controlling industrial processes, machines, manufacturing equipment, and other factory automation applications. In accordance with a control program or routine, an industrial controller can measure one or more process variables or inputs representative of the status of a controlled process, and change outputs effecting control of the process. The inputs and outputs can be binary, (e.g., on or off), and/or analog assuming a continuous range of values. The control routine can be executed in a series of execution cycles with batch processing capabilities, and can comprise one or more functional units. The measured inputs received from a controlled process and the outputs transmitted to the process can pass through one or more input/output (I/O) modules in a control system, which serve as an electrical interface between the controller and the controlled process, and can be located proximate or remote from the controller. The inputs and outputs can be recorded in an I/O table in processor memory. Input values can be asynchronously read from the controlled process by one or more input modules and output values can be written directly to the I/O table by a processor for subsequent communication to the process by specialized communications circuitry. An output module can interface directly with a controlled process, by providing an output from an I/O table to an actuator such as a motor, valve, solenoid, and the like.

During execution of the control routine, values of the inputs and outputs exchanged with the controlled process pass through the I/O table. The values of inputs in the I/O table can be asynchronously updated from the controlled process by dedicated scanning circuitry. This scanning circuitry can communicate with input and/or output modules over a bus on a backplane or network communications. The scanning circuitry can also asynchronously write values of the outputs in the I/O table to the controlled process. The output values from the I/O table can then be communicated to one or more output modules for interfacing with the process.

In distributed control systems, controller hardware configuration can be facilitated by separating the industrial controller into a number of control modules, each of which performs a different function. Particular control modules needed for the control task can then be connected together on a common backplane within a rack and/or through a network or other communications medium. The control modules can include processors, power supplies, network communication modules, and I/O modules exchanging input and output signals directly with the controlled process. Data can be exchanged between modules using a backplane communications bus, which can be serial or parallel, or via a network. In addition to performing I/O operations based solely on network communications, smart modules exist which can execute autonomous logical or other control programs or routines.

Various control modules of a distributed industrial control system can be spatially distributed along a common communication link in several racks. Certain I/O modules can thus be located proximate a portion of the control equipment, and away from the remainder of the controller. Data can be communicated with these remote modules over a common communication link, or network, wherein all modules on the network communicate via a standard communications protocol.

In a typical distributed control system, one or more I/O modules are provided for interfacing with a process. The outputs derive their control or output values in the form of a message from a master or peer device over a network or a backplane. For example, an output module can receive an output value from a processor, such as a programmable logic controller (PLC), via a communications network or a backplane communications bus. The desired output value is generally sent to the output module in a message, such as an I/O message. The output module receiving such a message will provide a corresponding output (analog or digital) to the controlled process. Input modules measure a value of a process variable and report the input values to a master or peer device over a network or backplane. The input values can be used by a processor (e.g., a PLC) for performing control computations.

In many control applications, it is desirable to synchronize the operation of one or more process actuators (e.g., valves, motors, etc.) in order to effectuate a control strategy, such as in conveyor systems having two or more motorized rollers, where the conveyor operates best when the motors operate in unison. Conventional distributed control devices typically include one or more control modules situated in a control rack or chassis, wherein the modules in a particular chassis communicate with each other over a backplane communications bus. Such controllers can include a counter associated with the backplane, which provides a coordinated system time (CST) value to the modules in the chassis. The system time value can be employed in one or more of the modules in a chassis in order to coordinate operation of one or more actuators associated with a controlled system. For instance, two or more motor drive control modules can be situated within a common control chassis with a CST timer providing time information to each of the motor drive modules. The modules can then perform coordinated control operations using the CST time information obtained from the backplane bus, whereby a certain amount of temporal synchronization can be achieved between such modules. Such synchronized operations can include time stamping input values, scheduling output events, and the like.

However, conventional CST time-sharing control equipment cannot provide for synchronizing control events outside of a single control chassis. In some industrial applications, control components associated with a controlled system may need to be located remotely from one another. In these situations, it can be impractical or impossible to locate all the control modules within a single rack or control chassis. Thus, for example, in a paper processing facility, motor controls may be required for a plurality of motor type actuators located remotely from one another. Consequently, it has heretofore been difficult or impossible to perform control actions in temporal synchronization across widely distributed control systems. In addition, CST timers associated with control chassis backplanes do not provide synchronization of control events performed in stand-alone controllers, such as motor drives. Moreover, individual CST timers in separate control racks or chassis can drift apart due to the accuracies of their respective timer circuits. Thus, there is a need for improved time synchronization methods and apparatus by which synchronized control actions can be achieved in distributed control systems.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

In accordance with the invention, systems, methods, protocols, and apparatus are provided for synchronizing controllers in a control system, by which the problems associated with prior systems and methods can be mitigated. The invention provides systems and methods for time synchronization of operations in a control system. Synchronization networks and devices are provided for transferring synchronization information between controllers in a distributed or localized control system, which is employed in order to allow operations of one or more such controllers to be synchronized with respect to time. Also disclosed are synchronization protocols and hardware apparatus employed in synchronizing control operations in a control system.

The invention provides for temporal synchronization of events and operations across multiple synchronization time zones, for example, whereby control events can be coordinated according to a master synchronization time value. In addition, the invention provides for time synchronization within localized synchronization time zones, and across multiple time zones. Synchronization components can be configured in a variety of topologies, such as star, daisy-chain, and loop configurations, as well as combinations thereof. The synchronization components, moreover, can be configured as master or slave, wherein slaves within a time zone receive synchronization information from a local master, and wherein a system master provides synchronization information to local masters in other time zones. The invention thus provides system wide synchronization, wherein time related control operations, such as time stamping inputs, scheduling outputs, and scheduling periodic or one-shot type events can be achieved in any controller in the system.

According to one aspect of the present invention, a time synchronization system is provided for an industrial control system, which comprises a synchronization network for transferring synchronization information between two or more controllers and two or more synchronization components operatively associated with the controllers. The synchronization components, which can comprise interfaces on stand-alone controllers, or synchronization modules within a control chassis or rack, interface with the synchronization network for transferring the synchronization information. The synchronization components exchange synchronization information with each other and provide the synchronization information to the associated controllers, which employ the synchronization information in order to operate in temporal synchronization.

Another aspect of the invention provides methods for synchronizing controllers in a control system. The methodologies comprise providing a communications channel for transferring synchronization information between first and second controllers in the control system, transferring synchronization information between the first and second controllers via the communications channel, and operating the first and second controllers in temporal synchronization using the synchronization information.

In accordance with yet another aspect of the invention, a protocol is provided for transferring synchronization information from a first synchronization component to a second synchronization component via a synchronization network. The protocol comprises sending a message frame from the first synchronization component to the second synchronization component, where the message frame has synchronization information and/or data. Still another aspect of the invention provides a method of transferring synchronization information from a first synchronization component to a second synchronization component, which comprises receiving a message frame from the first synchronization component, presenting direct data from the frame to a processor associated with the second synchronization component, buffering multiplexed data from the frame if all portions of the multiplexed data have not been received, and presenting the multiplexed data from a buffer and from the current message frame if all portions of the multiplexed data have been received.

Another aspect of the invention provides a time synchronization apparatus for synchronizing operation of a first controller with that of a second controller in a control system. The apparatus can be employed in stand-alone controllers, and/or in a module in a control chassis, and can comprise a processor interface for interfacing with a host processor, a transmitter adapted to transmit synchronization information and data to a network in the control system, a receiver adapted to receive synchronization information and data from the network, and a timing system with a clock maintaining an indication of time according to information received from one of the network and the host processor. Still another aspect of the invention provides a synchronization system for synchronizing operation of a first controller with that of a second controller in a control system.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE DRAWINGS

FIG. 3 is a schematic diagram illustrating a time synchronization system having a plurality of synchronization components configured in a daisy-chain topology;

FIG. 4 is a schematic diagram illustrating a time synchronization system having a plurality of synchronization components configured in a star topology;

FIG. 5 is a schematic diagram illustrating a time synchronization system having a plurality of synchronization components configured in a ring topology;

FIG. 14 is a schematic diagram illustrating an exemplary set of configuration options in accordance with one implementation the invention;

FIG. 18 is a schematic diagram illustrating a message frame data field associated with another configuration option in accordance with the invention;

FIG. 19 is a schematic diagram illustrating a message frame data field associated with another configuration option in accordance with the invention;

FIG. 20 is a schematic diagram illustrating a message frame data field associated with another configuration option in accordance with the invention;

FIG. 21 is a schematic diagram illustrating a message frame data field associated with another configuration option in accordance with the invention;

FIG. 22 is a schematic diagram illustrating a message frame data field associated with another configuration option in accordance with the invention;

FIG. 23 is a schematic diagram illustrating a message frame data field associated with another configuration option in accordance with the invention;

FIG. 24 is a schematic diagram illustrating a message frame data field associated with another configuration option in accordance with the invention;

FIG. 25 is a schematic diagram illustrating a message frame data field associated with another configuration option in accordance with the invention;

FIG. 26 is a schematic diagram illustrating a message frame data field associated with another configuration option in accordance with the invention;

FIG. 30 is a schematic diagram illustrating a message frame data field associated with another configuration option in accordance with the invention;

FIG. 31 is a schematic diagram illustrating a message frame data field associated with another configuration option in accordance with the invention;

DETAILED DESCRIPTION OF THE INVENTION

Figure 1:
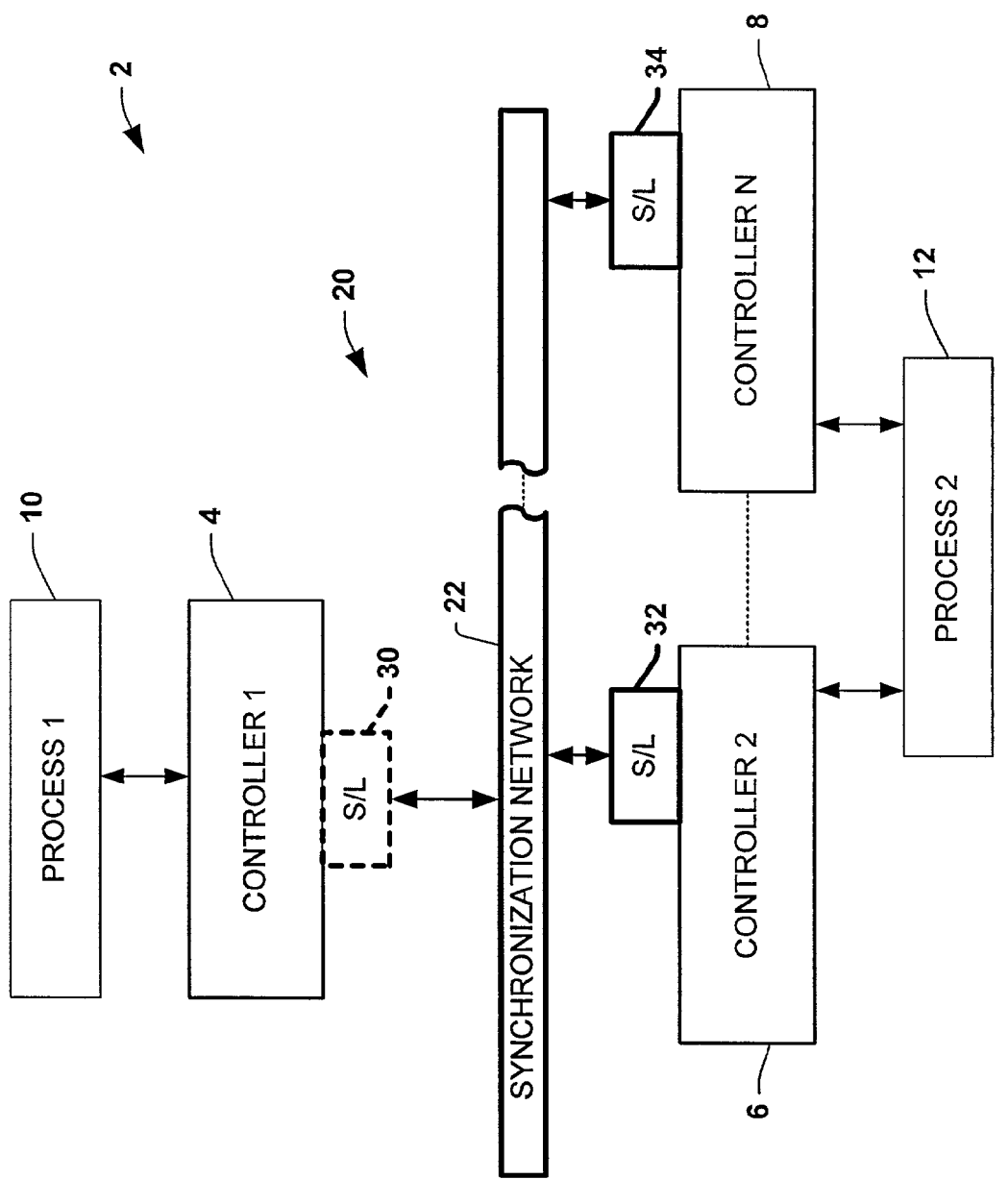
FIG. 1 is a schematic diagram illustrating an exemplary time synchronization system having a synchronization network and synchronization components associated with controllers in a control system in accordance with an aspect of the present invention.

The various aspects of the present invention will now be described with reference to the drawings, wherein like reference numerals are used to refer to like elements throughout. The invention provides methods and systems for synchronizing controllers in a control system, which overcome or mitigate the problems associated with prior systems and methods. Several exemplary implementations of the various aspects of the invention are hereinafter described. However, it will be appreciated that other implementations are possible within the scope of the appended claims, and that the invention is not limited to the implementations specifically illustrated and/or described herein.

Referring initially to FIG. 1, an exemplary control system 2 is illustrated having a plurality of controllers 4, 6, and 8 adapted to control one or more processes 10, 12, wherein more than one controller (e.g., controllers 6 and 8) can control portions of the same process (e.g., process 12). The controllers 4, 6, 8 receive process signals from one or more sensors (not shown) associated with the controlled processes 10, 12 and provide control signals to actuators such as motors, valves, solenoids, etc. (not shown) in order to operate the processes 10, 12 in a controlled fashion according to a control strategy (e.g., PID control about a setpoint) stored in the controllers 4, 6, 8. In accordance with the present invention, an exemplary time synchronization system 20 is provided for synchronizing the operation of two or more of the controllers 4, 6, 8 with respect to time (e.g., temporal synchronization), whereby various time related tasks or operations can be performed by the controllers 4, 6, 8 in a coordinated manner. Thus, for example, the controllers 4, 6, and/or 8 can time stamp inputs (e.g., input values received from the processes 10, 12), schedule outputs (e.g., outputting values to one or more actuators associated with the controlled processes 10, 12), scheduling periodic events, and/or scheduling one-time events.

The time synchronization system 20 comprises a synchronization network 22, which provides a communications channel for transferring synchronization information between two or more of the controllers 4, 6, and/or 8 in the control system 2. In addition, synchronization (e.g., synchlink or S/L) components 30, 32, and 34 are operatively associated with the controllers 4, 6, and 8, respectively, and interface with the synchronization network 22 for transferring the synchronization information therebetween. The synchronization components 30, 32, and 34 can be integrated within the associated controllers or connected therewith, and cooperate to exchange the synchronization information with each other, and additionally provide the synchronization information to the associated controllers 4, 6, and 8, respectively. The controllers 4, 6, and 8, can thus employ the synchronization information in order to perform various time-related tasks (e.g., time stamping inputs, scheduling outputs, scheduling periodic events, and/or scheduling one-time events) in temporal synchronization.

Figure 2:
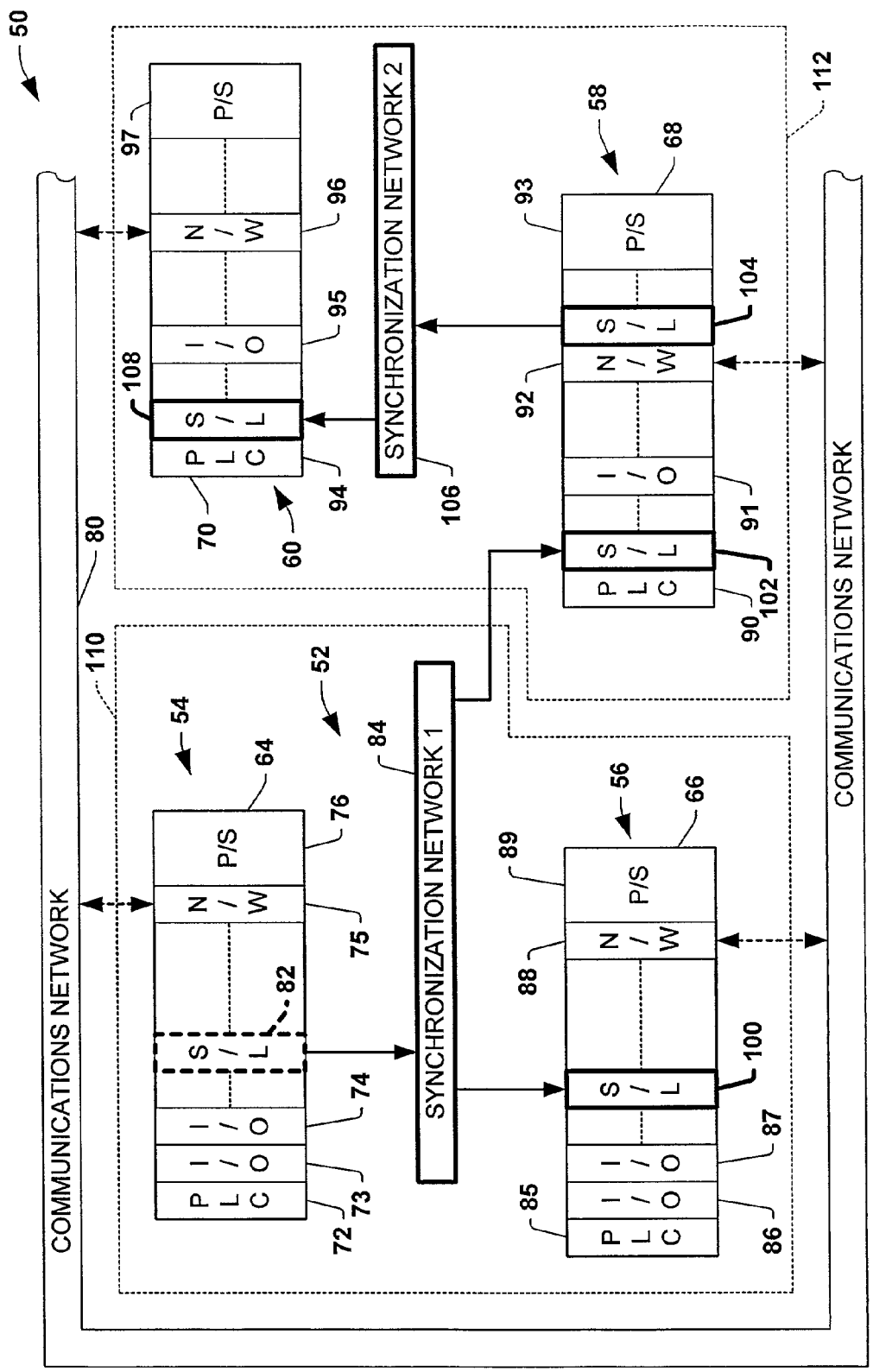
FIG. 2 is a schematic diagram illustrating another time synchronization system having two synchronization networks in separate synchronization time zones in accordance with another aspect of the invention.

Another exemplary control system 50 employing a time synchronization system 52 according to the invention is illustrated in FIG. 2, wherein controllers 54, 56, 58, and 60 comprise control chassis 64, 66, 68, and 70, respectively, wherein each chassis 64, 66, 68, and 70 has one or more control modules installed therein, as described in greater detail hereinafter, including one or more synchronization modules. In the exemplary time synchronization system 52, controller 54 includes chassis 64, having a programmable logic controller (PLC) or processor module 72, input/output (I/O) modules 73 and 74, network module 75, and a power supply module 76 installed therein. The modules 72–76 communicate with each other via a bus on a common backplane (not shown) in a manner known in the art, wherein the modules 72–75 receive power from the power supply module 76 via the backplane. The controller 54 can interface with a process (not shown) for controlled operation thereof via the PLC module 72 and the I/O modules 73, 74 according to a control strategy programmed in the PLC. The network module 75 interfaces the controller 54 with a communications network 80 through which control information, data, configuration information, and other data is transferred in the form of messages according to a protocol, whereby such information can be shared between the controller 54 and other devices connected thereto (e.g., controllers 56, 58, 60).

The exemplary controller 54 further comprises a synchronization or synchlink (S/L) module 82 located in the control chassis 64, which provides synchronization information from a synchronization network 84 to other modules (e.g., modules 72, 73, 74, 75, and/or 76) in the control chassis 64, whereby the modules in the chassis 64 and other controllers (e.g., controllers 56, 58, 60) can be operated in temporal synchronization. The exemplary synchronization network 84 can comprise a special purpose fiber optic serial link providing synchronization and coordination of controllers 54, 56, 58, and/or 60 in the control system 50. The other controllers 56, 58, and 60 in the system 50 similarly comprise various control modules installed in the associated control chassis 66, 68, and 70, respectively. For instance, controller 56 comprises a PLC module 85, I/O modules 86 and 87, a network module 88 and a power supply module 89 in chassis 66; controller 58 comprises a PLC module 90, an I/O module 91, a network module 92 and a power supply module 93 in chassis 68; and the controller 60 comprises a PLC module 94, an I/O module 95, a network module 96 and a power supply module 97 in chassis 70.

The synchronization module 82 in chassis 64 of controller 54 is configured as a time or synchronization master for the synchronization system 52, whereby the module 82 provides synchronization information, such as actual time values, periodic tones, etc., via messages sent through the synchronization network 84. The master synchronization module 82, moreover, provides such synchronization information to other modules (e.g., modules 72–76 in the chassis 64, via the backplane (not shown) associated therewith. In this regard, the master synchronization module 82 can alternatively be configured to receive actual time and/or other synchronization information from a control module in the chassis 64 (e.g., from PLC module 72), whereby the PLC 72 can be both function master (e.g., master controller with respect to determining appropriate control actions in accordance with a control scheme or program stored therein), as well as a synchronization time master for the system 50. However, it will be appreciated that the present invention advantageously provides for separation of the time master and function master roles, for instance, whereby the PLC module 72 can be the functional master with respect to such control actions, and the synchronization module 82 can be the time master for the system 50.

The controller 56 also comprises a synchronization module 100 installed in the control chassis 66, which interfaces with the synchronization network 84, wherein the module 100 is configured as a slave synchronization module receiving synchronization information from the master synchronization module 82 via the synchronization network 84. The slave module 100, in turn, provides such synchronization information to the control modules (e.g., modules 85, 86, 87, 88, and/or 89) in the control chassis 66. In this fashion, the controllers 54 and 56 can be advantageously operated in temporal synchronization according to common actual and relative time values shared via the synchronization modules 82 and 100, and the synchronization network 84.

Controller 58 also comprises a synchronization module 102 in the chassis 68, which is configured as a slave to receive synchronization information from the master module 82 via the synchronization network 84, as well as a second synchronization module 104 in the chassis 68, which is operatively associated with a second synchronization network 106. The module 102 relays synchronization information received from the master synchronization module 82 via the network 84 to the backplane (not shown) of chassis 68, which synchronization module 104 provides to the second synchronization network 106. The synchronization information is then provided to the controller 60 via another synchronization module 108 in the chassis 70 thereof via the second synchronization network 106.

As described in greater detail hereinafter, the controllers 54 and 56 are configured in a first synchronization time zone 110 including the first synchronization network 84, and the controllers 58 and 60 are in a second time zone 112 including synchronization network 106 in accordance with another aspect of the present invention. For example, chassis and control devices within a time zone can be synchronized with respect to identical actual time values (e.g., coordinated system time (CST) values based on a 1 $\mu$s counter value), whereas chassis and devices in a different synchronization time zone can have different CST values that can be synchronized (e.g., for comparing time stamp values associated with input events or the like) using a network offset and least common multiple (LCM) synchronization. The network offset, in this regard, can be computed (e.g., in a synchronization module or component bridging two synchronization time zones) such that the sum of a local CST (e.g., actual time value) and the network offset will equal the sum of the remote CST and the remote network offset, wherein the network offsets are a multiple of an LCM interval. The synchronization component or module which computes such an offset, then broadcasts the offset to downstream synchronization components as part of the synchronization information.

The synchronization components or modules 82, 100, 102, 104, and 108 associated with the controllers 54, 56, 58, and 60, respectively, can be configured (e.g., via appropriate hardware, firmware, and/or software settings, not shown) to operate in one of three modes. In one such mode, a synchronization module (e.g., master module 82) is configured to act as time master for temporal synchronization purposes. The master provides synchronization information to other synchronization modules via a network, where the synchronization information allows coordinated operation of two or more controllers in the system 50 with respect to time-related control operations (e.g., time stamping inputs, scheduling outputs, scheduling periodic events, and/or scheduling one-time events). For instance, the exemplary module 82 is configured as the synchronization master, and provides synchronization information via messages every 50 μs, wherein such messages or datagrams can include data as well as synchronization information, as illustrated and described further hereinafter. Although the exemplary synchronization system 52 is adapted for transfer of such messages about every 50 μs, it will be appreciated that other message periods are contemplated as falling within the scope of the present invention.

Some such messages can comprise a tone indication, wherein the tone messages are sent periodically. For instance, the tone messages can be sent every 600 ms, wherein the master module 82 provides the actual time value to be used at the next tone message in previous messages to the slave modules 100, 102, 104, and 108. The tone messages can be used to establish a least common multiple (LCM) period, which can be set to the lowest integer multiple of periodic tasks in the system 50. The exemplary LCM period employed in the system 52 is set to 600 ms, whereby periodic tasks can be performed at 1 ms, 2 ms, 3 ms, 4 ms, 5 ms, 6 ms, 8 ms, 10 ms, 12 ms, and other desirable periods. However, it will be appreciated that other LCM periods fall within the scope of the present invention. The LCM tone messages provide synchronization points at which the control components in the controllers 54, 56, 58, and/or 60 can be temporally synchronized, in order to perform time-related control operations in synchronized fashion in accordance with the invention.

The synchronization modules can alternatively be configured or programmed to operate as a slave receiving synchronization information from a master within the same time zone. For example, slave module 100 in chassis 66 of controller 56 is programmed to receive synchronization information from the master module 82 in the time zone 110. When the slave module 100 receives the LCM tone, it adjusts its own internal timers, clocks, counter circuits, etc., in order to synchronize its internal concept of time with that of the master module 82. The slave module 100 further provides this time information to one or more of the other modules 85, 86, 87, 88, and/or 89 in the chassis 66. In this fashion, the PLC modules 72 and 85 of the controllers 54 and 56, respectively, can schedule periodic tasks to occur at the same times or otherwise in temporally coordinated fashion, in order to achieve a desired control operation of one or more controlled processes (not shown) associated therewith. For instance, where the controllers operate motors associated with a conveyor system, the motors can be made to operate at the same time, and at the same speed, in order to properly operate the conveyor. Such operation can include ramping such motor speeds, starting and stopping in unison, and other time coordinated operation, for example.

In addition, the synchronization modules can be configured in a third operating mode. For example, in the exemplary time synchronization system 52, the synchronization module 102 is configured to operate as a slave receiving synchronization information from a master in a different synchronization time zone. This allows the module 102 to effectively bridge two time zones 110 and 112, whereby the invention provides for synchronous operation across such time zones. The modules 104 and 108 are configured in the system 52 to operate as slaves receiving synchronization information from a master within the second time zone 112 in a fashion similar to the operation of module 100 in time zone 110. The employment of two time zones 110 and 112 in the system 52 allows controllers within the individual zones 110 and/or 112 to operate in local synchronism, and/or to operate in global synchronism across both time zones 110 and 112.

In the first case, the synchronization module 102 can operate as a local time master with respect to time zone 112 where no synchronization information is received from the module 82 via the network 84. The module 102 establishes an internal actual time value, and provides LCM tones and information via the backplane (not shown) of the chassis 68 to the slave module 104, which in turn provides such to the module 108 via the second synchronization network 106 in the second time zone 112. The controllers 58 and 60 of the second time zone 112 can thus operate in local synchronization (e.g., wherein time related events or actions in the controllers 58 and 60 are performed according to the LCM and/or actual time value established by the local time master 102), independently from the operation of the controllers 54 and 56 in the first time zone 110.

Thereafter, if the controller 54 is subsequently powered up, and the master synchronization module 82 begins sending synchronization information messages via the first synchronization network 84, the module 102 operates to relay the synchronization information from the master module 82 to the controllers 58 and 60 via the slave modules 104, 108, and the second synchronization network 106. Thereafter, the controllers 58 and 60 in the second synchronization time zone 112 (e.g., as well as the controllers 54 and 56 in the first time zone 110) can perform time-related control operations (e.g., time stamping inputs, scheduling outputs, scheduling periodic events, and/or scheduling one-time events) in globally synchronized fashion throughout the system 50 according to the LCM from the master synchronization module 82.

In addition, the slave module 102 can compute an offset based on the difference between it's own actual time value (e.g., a local time value for the second time zone 112) and the actual time value from the master module 82, whereby comparison of time stamped events (e.g., input signals from a controlled process, or the like) can be performed by one or more of the controllers 54, 56, 58, and/or 60 in the system 50. Moreover, in order to initially synchronize the operation of the controllers 58 and/or 60 in the second time zone 112 with the synchronization information (e.g., LCM) from the master module 82 of time zone 110, the slave module 102 can perform appropriate ramping of it's internal timers, clocks, counters, etc., in order to synchronize to the master's LCM period.

In this regard, it will be appreciated that such ramping can be employed to advantageously avoid skipping time, or resetting time values in one or more of the controllers 58 and/or 60 backwards, whereby adverse results associated therewith can be avoided. In addition, it will be recognized that individual control modules (e.g., PLC modules, I/O modules, network modules, power supply modules, and/or other slave synchronization modules, can include timers, counters, clock circuits, etc., which can be likewise ramped accordingly, in somewhat continuous fashion, in order to maintain synchronicity with the LCM period received. In this manner, the modules in the system 50 can achieve temporal synchronization without cumulative drift.

The time synchronization system 52 can operate as described above, wherein the synchronization information is transferred unidirectionally via the synchronization networks 84 and 106 and the synchronization modules 82, 100, 102, 104, and 108, and wherein one of the synchronization components or modules (e.g., module 82) is configured as a master providing the synchronization information to the other synchronization modules in the system 52. It will be appreciated, however, that other forms of synchronization information transfer fall within the scope of the invention apart from the architectures illustrated and described herein. For instance, bi-directional communications protocols can be employed in order to transfer synchronization information between synchronization modules, using the exemplary synchronization networks 84 and/or 106.

Also, other networks can be employed for transfer of such synchronization information, such as the communications network 80 (e.g., CONTROLNET, DEVICENET, Ethernet, or other network types). In this regard, those skilled in the art will recognize that the various aspects of the invention can be employed in association with separate synchronization networks servicing synchronization information transfer functions, possibly with limited (e.g., high speed) data transfer capabilities, as well as with currently available networks (e.g., communications network 80). Thus, for example, synchronization information can be disseminated from the synchronization time master synchronization module 82 through the communications network 80 (e.g., employing the network interface module 75 as needed, and/or where the synchronization module 82 itself is adapted to interface directly with the communications network 80) to other synchronization modules (e.g., modules 100, 102, 104, and/or 108) within the system 50, in order to effectuate temporally synchronized operation of two or more of the controllers 54, 56, 58, and/or 60), wherein such information is transferred using the communications protocol normally associated with the network 80 (e.g., employing network addressing schemes, acknowledgements, retransmissions, error-correction and detection schemes, and the like).

Moreover, the independent (e.g., locally synchronized) operation of controllers within a synchronization time zone (e.g., controllers 58 and 60 operating in synchronous fashion with respect to each other) can be accomplished wherein the synchronization module 102 operates as a local master providing LCM (e.g., and actual time) information to the slave module 108 via the communications network (e.g., where the network 80 functions as a synchronization network), and subsequently operates as a slave when the system synchronization master module 82 begins sending synchronization information via the network 80, with or without dedicated synchronization networks, or with combinations of dedicated and non-dedicated networks, within the scope of the present invention. For instance, the system 50 can be operated with one, some, or all of the networks 80, 84, and/or 106.

With respect to synchronized operation of the various controllers 54, 56, 58, and/or 60 in the system 50, the exemplary time synchronization system 52 provides temporal synchronization with respect to both absolute time and relative time. Thus, for instance, a determination can be made in PLC module 72 of controller 54 as to whether an input event read by I/O module 95 of controller 60 (e.g., in time zone 112) occurred before, after, or concurrently with another input event sensed by I/O module 87 of controller 56 (e.g., in time zone 110). These input events (e.g., and/or values associated therewith) can be time stamped, for instance, by the I/O modules 95 and 87, using the actual time values associated with the local master synchronization module 102 in time zone 112 and the system time master synchronization module 82 in time zone 110, respectively. The PLC module 72 can obtain these time stamps, as well as an offset value (e.g., determined by the local master module 102 as the difference between it's own (e.g., local) actual time and the actual time of the master module 82), and perform a comparison, in order to determine the sequence of the events in the I/O modules 95 and 87. Thus, the time synchronization system 52 provides for absolute time synchronization, both within a single time zone, as well as across different time zones.

The invention further provides for relative temporal synchronization, for example, wherein periodic tasks are scheduled in different controllers in the system 50 to occur at the same time. For instance, a periodic event (e.g., toggling the state of a boolean output to alternatively open and close a valve) can be scheduled for an output associated with I/O module 91 (e.g., in time zone 112) at an interval (e.g., 10 ms), which is a factor of the LCM interval (e.g., 600 ms) provided by the master synchronization module 82. Another related periodic event (e.g., alternatively starting and stopping a motorized pump) can be scheduled for an output associated with I/O module 74 (e.g., in time zone 110) at an interval of 10 ms. Because the I/O module 74 is synchronized according to the LCM provided by synchronization module 82, and because the I/O module 91 is synchronized to the same LCM interval (e.g., via the synchronization module 102), the events (e.g., alternatively opening the valve and starting the pump, or closing the valve and stopping the pump) can be performed in unison, wherein the events are temporally synchronized relative to one another. It will be appreciated that temporal synchronization, either absolute or relative, comprises exact synchronization in time, as well as synchronization within the accuracies of the various timing elements in the system 50, whether clock circuits or devices, counters, timers, or the like.

Referring now to FIGS. 3–5, the synchronization components according to the invention can be connected in a variety of different topologies, such as a daisy-chain topology 120 as illustrated in FIG. 3, a star type topology 130 as illustrated in FIG. 4, a loop or ring type topology 150 as illustrated in FIG. 5, and/or combinations thereof. In the daisy-chain topology 120, a master node 121 is connected to a first center node 122, which in turn is connected to a second center node 123, which itself is connected to an end node 124, with individual (e.g., dual connection) synchronization networks therebetween. The nodes 121, 122, 123, and 124 individually comprise a synchronization component operating in similar fashion to the synchronization components illustrated and described above with respect to FIGS. 1 and 2. Referring also to FIG. 5, the loop or ring type topology 150 similarly comprises a master node 151, and succeeding center nodes 152 and 153, as well as an end node 154, wherein the end node is further connected back to the master node 151, thus completing the loop or ring.

In the daisy-chain topology 120, synchronization information is transferred from one node to the adjacent node from the master node 121 through the nodes 122, 123, and 124 in serial fashion via messages through the intervening networks, whereby a message is transferred from the master node 121 to the end node 124 in 3 message periods, for example, wherein the message period is 50 μs according to one exemplary implementation. The synchronization components associated with the individual nodes 122, 123, and 124 are operative in the daisy-chain topology 120 (e.g., as well as in the loop or ring type topology 150 illustrated in FIG. 5) to pass direct data from the received messages to the next neighbor node in the next (e.g., 50 μs) message period.

The synchronization components, furthermore, wait an integer number of such message periods before processing the direct data thus received. For instance, the nodes can comprise an integrated circuit synchronization device with a buffer, wherein the received direct data is buffered for 10 such message periods (e.g., 500 μs), and then presented by the synchronization device to an associated processor for further processing thereof. The direct data, moreover, can be sent a number of times, as illustrated and described in greater detail hereinafter, wherein, for example, 10 such messages can include the same direct data (e.g., synchronization information and/or control data), whereby data flooding is provided as a means to improve data transfer without the performance costs associated with acknowledgements, retransmissions, and the like. In general, where an integer number N such nodes are configured in a daisy-chain topology, N−1 intervening synchronization networks will be provided therebetween, and transfer of messages from a master node to an end node will take N−1 message periods. Thus, the daisy chain topology 120 can find application in association with small systems, whereby information transfer is achieved in a reasonable amount of time.

Furthermore, the daisy-chain (e.g., and ring) type topology allows individual nodes (e.g., nodes 122, and/or 123) to alternatively pass direct data from such messages through to the next neighbor node, or modify such data. For instance, in a steel rolling operation wherein controllers associated with the individual nodes 121–124 operate rollers along a line, the speed of each succeeding roller may need to be greater than the speed of the previous roller. Accordingly, the invention allows the master node 121 to send speed (e.g., setpoint) information relating to the speed at which it's associated controller is operating to the downstream node 122 increased by a multiplier, which is used by the controller associated with node 122. Likewise, node 122 can further multiply the resulting speed by a multiplier, and so on, whereby the speed information transferred to the controllers associated with nodes 121–124 are incrementally increased.

In this manner, the synchronization components or modules associated with the individual nodes 121–124 of the exemplary daisy-chain topology or configuration 120 are each presented with synchronization message data at the same 500 μs intervals. Where the current message being presented includes an LCM pulse or tone, for example as described above, the invention provides the tone to each of the nodes 122, 123, and 124 at the same time, thereby allowing synchronous operation of controllers (not shown) associated therewith. For instance, once the tone message data is provided from the synchronization devices in nodes 122–124 to the associated processors, the processors can individually adjust (e.g., via appropriate ramping techniques) their individual clocks, timers, counters, etc., in order to maintain synchronization to the LCM, and further provide the LCM interval tone to associated control devices (e.g., stand-alone controllers and/or modules in a control rack or chassis with which the synchronization node is associated). These control modules, likewise, adjust their internal timekeeping circuitry in order to establish synchronism with the LCM interval. Thus, time-coordinated actions by such control devices can be accomplished via the daisy-chain connected nodes 121–124.

The invention also contemplates star type topologies such as the exemplary star topology 130 of FIG. 4. Whereas the daisy-chain and ring type topologies (e.g., configurations 120 and 150) provide for use of a scaling factor or multiplier whereby each node can modify the data being forwarded to succeeding nodes (e.g., possibly at the expense of the time penalty resulting from the number of nodes in a chain or loop), the star type topology 130 provides for immediate transfer of data messages from a master node 131 to each end node 132–137, via one or more hubs 140–142. The hubs 140–142 provide for transfer of messages (e.g., data and/or synchronization information) therethrough without significant time delay, and with any appropriate signal conditioning or translation in order to pass the message from a source node to one or more destination nodes (e.g., from master node 131 to the end nodes 132–137). Thus, for example, where the synchronization network(s) comprise fiber optic pipes, the hubs 140–142 can each translate optical signals from an input pipe into electrical signals, and then provide corresponding output optical signals to one or more output optical pipes, for transmission therethrough to the destination (e.g., an end node or another hub).

The exemplary star topology 130 of FIG. 4 thus provides high-speed information transfer, possibly at the expense of the ability to incrementally modify message data, such as via the multiplier available with the daisy-chain and loop topologies. In addition, the star topology 130 allows interconnection of large numbers of synchronization nodes. For example, where each of the hubs 140–142 can accommodate sixteen output connections, the exemplary two-level star topology 130 of FIG. 4 can interconnect up to 256 nodes receiving synchronization and/or data from a single master node 131, wherein each output of the first level hub 140 is connected to a second level hub having sixteen end nodes connected thereto. It will be appreciated that the invention contemplates star type topologies having more than two hierarchical levels, and accommodating more or less end nodes than those specifically illustrated and described herein, and furthermore, that hybrids or combinations of one, some, or all of the star, daisy-chain, and/or ring topologies fall within the scope of the present invention.

Figure 6:
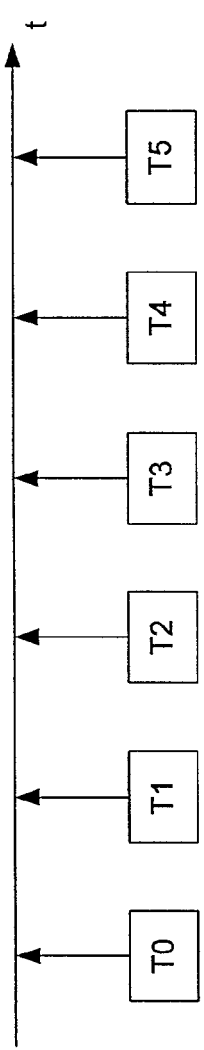
FIG. 6 is a schematic diagram illustrating a time line with equal M-scan and D-scan rates in accordance with the invention.
Figure 7:
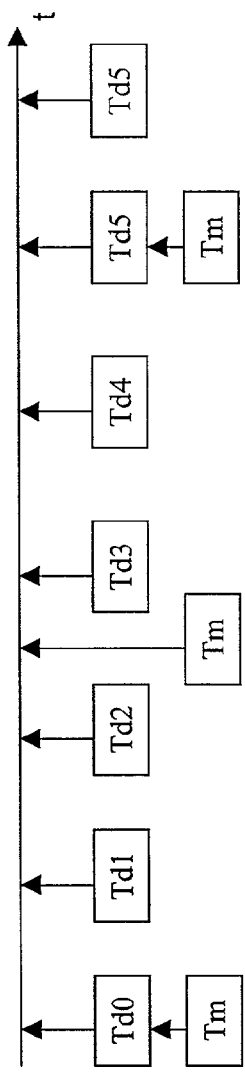
FIG. 7 is a schematic diagram illustrating a time line with differing M-scan and D-scan rates in accordance with the invention.

Referring now to FIGS. 6 and 7, the synchronization components can be adapted to send one or more types of data via the datagrams or message frames exchanged between such components. Such data can include direct data (e.g., transmitted in a single datagram) and multiplexed or package data (e.g., transmitted over two or more datagrams). For instance, in the example described above, the synchronization components can comprise a synchronization or SynchLink integrated circuit chip operatively connected to a host processor, and the synchronization components send and/or receive such datagrams every 50 μs, wherein a snapshot of the direct data is made available to the host processor at a configurable multiple of 50 μs (e.g., every 500 μs). The interval where such direct data is presented to the host processors in the synchronization components can be referred to as the D-scan rate. The transmit circuitry in the synchronization components can also lock the data, whereby the same direct data is transmitted during the entire D-scan. Alternatively, the synchronization components can be configured to perform pass through operations, wherein the data received is sent out in the succeeding message frame.

Moreover, the output direct data can be modified, for example, using the multiplier described herein (e.g., in daisy-chain and/or ring type topologies).

The time required to send multiplexed data can be based on the configured size of the package, and the number of words in each datagram frame devoted to the multiplexed data. Like the direct data, the multiplexed or package data is made available to the host processor at a configurable multiple of 50 $\mu$s, wherein the multiples of 50 $\mu$s for the direct and package data presentation can be configured separately. The interval for presentation of multiplexed or package data to the host processor is referred to as the M-scan rate or simply M-scan, wherein the M-scan can be a factor of the LCM time. In order to ensure data integrity, both the sender and receiver can be configured to the same M-scan. In this regard, it will be appreciated that the M-scan and D-scan intervals can be set differently, or to the same interval, for example, wherein the M-scan and D-scan are set to 500 $\mu$s.

Several examples are illustrated and described below with respect to FIGS. 6 and 7, wherein two separate time lines are used to illustrate the D-scan and M-scan intervals. FIG. 6 illustrates the situation in which the D-scan and M-scan rates are the same. In FIG. 7, the D-scan interval is illustrated as being shorter than the M-scan interval, however, for long daisy chain applications where the direct data is presented to the host processors in each node at the same time, a long D-scan can be employed.

Figure 8:
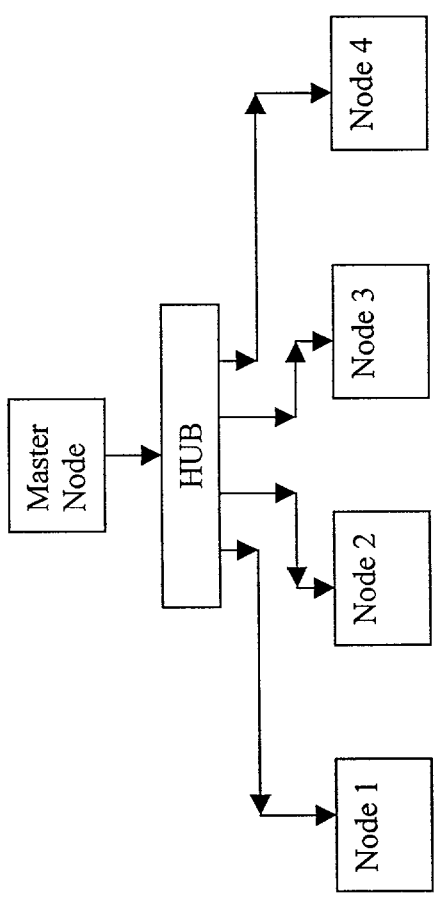
FIG. 8 is a schematic diagram illustrating another exemplary star topology in accordance with the invention.

In FIG. 8, an exemplary star configuration or topology is illustrated, and the following description is provided in order to demonstrate the data timing characteristics of the star topology. For equal M-scan and D-scan intervals or rates, between two times T0 and T1 (e.g., FIG. 6), the master node processor writes both direct data D1 and multiplexed data M1 to the associated SynchLink chip (not shown). At T1, the SynchLink chip in the master node locks data D1 and M1 to transmit, and between T1 and T2, the master node transmits data D1 and M1 to all slaves, and the master node processor writes both direct data D2 and multiplexed data M2 to the SynchLink chip. At T2, the SynchLink chips in the slaves present snapshots of data D1 and M1 to the corresponding host processors, and the SynchLink chip in the master node locks data D2 and M2 to transmit.

For different M-scan and D-scan rates in the star configuration of FIG. 8, between times Td0 and Td1 (e.g., FIG. 7), the master node processor writes direct data D1 to the SynchLink chip and at Td1 the SynchLink chip in the master node locks direct data D1 to transmit. Between Td1 and Td2, the master node transmits direct data D1 to all slaves and the master node processor writes direct data D2 to the SynchLink chip. Thereafter at Td2, the SynchLink chips in the slaves present snapshots of direct data D1 to the corresponding host processors and the SynchLink chip in the master node locks direct data D2 to transmit. Between Tm0 and Tm1, the master node processor writes multiplexed data M1 to the SynchLink chip, and at Tm1, the SynchLink chip in the master node locks multiplexed data M1 to transmit. Between Tm1 and Tm2, the master node transmits multiplexed data M1 to all slaves and the master node processor writes multiplexed data M2 to the associated SynchLink chip. At Tm2, the SynchLink chips in the slaves present snapshot of multiplexed data M1 to their host processors, and the SynchLink chip in the master node locks multiplexed data M2 to transmit.

Figure 9:
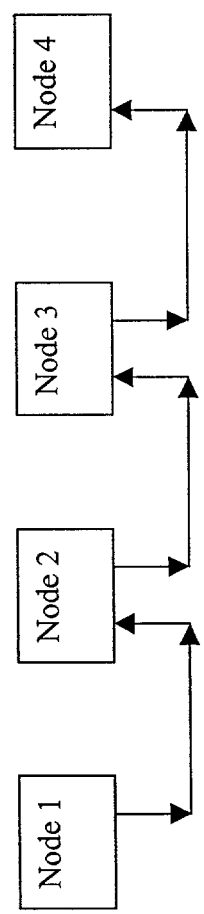
FIG. 9 is a schematic diagram illustrating another exemplary daisy-chain topology in accordance with the invention.

Referring now to FIG. 9, a daisy chain topology is illustrated and the following description is provided to further illustrated the data timing of an implementation of the invention wherein pass through is not employed. In the daisy chain configuration of FIG. 9 where pass through is not being used, the data transfers from each node to the downstream node are the same as for a ring type configuration (e.g., loop topology of FIG. 5). In the case of equal M-scan and D-scan rates (e.g., FIG. 6), between T0 and T1 each host processor (n) writes both direct data $D_n1$ and multiplexed data $M_n1$ to the corresponding SynchLink chip and at T1 the SynchLink chip in each node (n) locks data $D_n1$ and $M_n1$ to transmit. Between T1 and T2, each node (n) transmits data $D_n1$ and $M_n1$ to the downstream device and each processor (n) writes both direct data $D_n2$ and multiplexed data $M_n2$ to the SynchLink chip. At T2, the SynchLink chips in each node (n) present a snapshot of data $D_{n-1}$ and $M_{n-1}$ to the host processors, and the SynchLink chip in each node (n) locks the data $D_n2$ and $M_n2$ to transmit.

For different M-scan and D-scan rates or intervals (e.g., FIG. 7), between Td0 and Td1 each processor (n) writes direct data $D_n1$ to the associated SynchLink chip and at Td1 the SynchLink chip in each node (n) locks direct data $D_n1$ to transmit. Between Td1 and Td2 each node (n) transmits direct data $D_n1$ to the downstream device and each processor (n) writes direct data $D_n2$ to the SynchLink chip. At Td2 the SynchLink chips in each node (n) present a snapshot of direct data $D_{n-1}1$ to the host processor and the SynchLink chip in each node (n) locks direct data $D_n2$ to transmit. Between Tm0 and Tm1 each processor (n) writes multiplexed data $M_n1$ to the SynchLink chip and at Tm1 the SynchLink chip in each node (n) locks multiplexed data $M_n1$ to transmit. Thereafter between Tm1 and Tm2, each node (n) transmits multiplexed data $M_n1$ to the downstream device and each processor (n) writes multiplexed data $M_n2$ to the corresponding SynchLink chip. At Tm2, the SynchLink chip in each node (n) presents a snapshot of multiplexed data $M_{n-1}$ to the host processor and locks multiplexed data $M_n2$ to transmit.

Where pass through is enabled or configured in the daisy-chain (e.g., or loop type) topology or configuration, and with equal M-scan and D-scan rates, between T0 and T1 the host processor in node 1 writes direct data D1 to the SynchLink chip and each processor (n) writes multiplexed data $M_n1$ to the corresponding SynchLink chip. At T1, the SynchLink chip in node 1 locks data D1 to transmit and the SynchLink chip in each node (n) locks multiplexed data $M_n1$ to transmit. Between T1 and T2, node 1 transmits direct data D1 to node 2 and each node (n) transmits data $M_n1$ to the downstream device. 50 $\mu$s after T1, the SynchLink chip in node 2 copies direct data D1 from a receive buffer therein to a transmit buffer. 100 $\mu$s after T1, the SynchLink chip in node 3 copies direct data D1 from its receive buffer to its transmit buffer.

At each remaining 50 $\mu$s period up to T2, another node in daisy chain receives direct data D1. Between T1 and T2, the processor in node 1 writes direct data D2 to the SynchLink chip, and each processor (n) writes multiplexed data $M_n2$ to its SynchLink chip. At T2, the SynchLink chips in each node (n) presents a snapshot of data D1 and $M_{n-1}$ 1 to the host processors, the SynchLink chip in node 1 locks data D2 to transmit, and the SynchLink chip in each node (n) locks multiplexed data $M_n2$ to transmit. It will be appreciated that the description above assumes that the number of nodes in the daisy chain is small enough so that the direct data being passed through can reach each node before the next scan time. Longer daisy chains can be employed wherein the application loop time is longer than the D-scan rate.

Where different M-scan and D-scan rates are employed, between Td0 and Td1 the processor in node 1 writes direct data D1 to its SynchLink chip and at Td1 the SynchLink chip in node 1 locks data D1 to transmit. Between Td1 and Td2, node 1 transmits direct data D1 to node 2 and 50 µs after Td1, the SynchLink chip in node 2 copies direct data D1 from the receive buffer to the transmit buffer associated therewith. 100 µs after Td1, the SynchLink chip in node 3 copies direct data D1 from its receive buffer to its transmit buffer. At each remaining 50 µs period up to Td2, another node in the daisy-chain receives direct data D1 and between Td1 and Td2 the processor in node 1 writes direct data D2 to its corresponding SynchLink chip.

At Td2, the SynchLink chips in each node (n) present a snapshot of direct data D1 to their host processor and the SynchLink chip in node 1 locks data D2 to transmit. Between Tm0 and Tm1, each processor (n) writes multiplexed data $M_n1$ to the SynchLink chip and at Tm1 the SynchLink chip in each node (n) locks multiplexed data $M_n1$ to transmit. Between Tm1 and Tm2, each node (n) transmits multiplexed data $M_n1$ to the downstream device and each processor (n) writes multiplexed data $M_n2$ to the SynchLink chip. At Tm2, the SynchLink chips in each node (n) present a snapshot of multiplexed data $M_{n-1}$ to the host processor and lock the multiplexed data $M_n2$ to transmit.

As discussed above, the synchronization component can be adapted to provide modification of data being transferred in a daisy-chain topology from node to node, such as by a multiplier. In a daisy-chain configuration using such as multiplier, and wherein equal M-scan and D-scan rates are employed, between T0 and T1, the processor in node 1 writes direct data D1 to the SynchLink chip and each processor (n) writes multiplexed data $M_n1$ to its associated SynchLink chip. At T1 the SynchLink chip in node 1 locks data D1 to transmit and the SynchLink chip in each node (n) locks multiplexed data $M_n1$ to transmit. Between T1 and T2 node 1 transmits direct data D1 to node 2 and each node (n) transmits data $M_n1$ to the downstream device. 50 µs after T1, the SynchLink chip in node 2 multiplies direct data D1 with the value in its multiplier buffer (e.g., which can be stored there by the host computer) and copies the resulting $D1_2$ to its transmit buffer. 100 µs after T1, the SynchLink chip in node 3 multiplies direct data $D1_2$ with a value in its multiplier buffer and copies result $D1_3$ to the associated transmit buffer.

At each remaining 50 µs period up to T2, another node in daisy chain receives direct data $D1_{n-1}$ and generates $D1_n$. Between T1 and T2, the processor in node 1 writes direct data D2 to its SynchLink chip, and each processor (n) writes multiplexed data $M_n2$ to its SynchLink chip. At T2, the SynchLink chips in each node (n) present a snapshot of data $D1_{n-1}$ and $M_{n-1}$ to the corresponding host processors, the SynchLink chip in node 1 locks data D2 to transmit, and the SynchLink chip in each node (n) locks multiplexed data $M_n2$ to transmit. As with the above case of pass through data, the description above assumes that the number of nodes in the daisy-chain is small enough so that the direct data can reach each node before the next scan time. For instance, where the D-scan interval is set to 500 µs, daisy-chain topologies up to 10 nodes can be configured to perform as described above, and longer daisy-chains can be used where the application loop time is longer than the D-scan rate.

In the case of different M-scan and D-scan rates, between Td0 and Td1 the processor in node 1 writes direct data D1 to its SynchLink chip and at Td1, the SynchLink chip in node 1 locks data D1 to transmit. Between Td1 and Td2, node 1 transmits direct data D1 to node 2, and 50 µs after Td1, the SynchLink chip in node 2 multiplies the direct data D1 with the value in its associated multiplier buffer and copies the resulting $D1_2$ to its transmit buffer. 100 µs after Td1, the SynchLink chip in node 3 multiplies the direct data $D1_2$ with a multiplier value in its multiplier buffer and copies the result $D1_3$ to its transmit buffer. At each remaining 50 µs period up to Td2, another node in the daisy-chain receives direct data $D1_{1-n}$ and generates $D1_n$ in similar fashion, and between Td1 and Td2 the processor in node 1 writes direct data D2 to its SynchLink chip.

At Td2, SynchLink chips in each node (n) present a snapshot of direct data $D1_{n-1}$ to their respective host processor, and the SynchLink chip in node 1 locks data D2 to transmit. Between Tm0 and Tm1 each processor (n) writes multiplexed data $M_n1$ to its corresponding SynchLink chip. At Tm1, SynchLink chips in each node (n) lock multiplexed data $M_n1$ to transmit. Thereafter between Tm1 and Tm2, each node (n) transmits multiplexed data $M_n1$ to the downstream device and each processor (n) writes multiplexed data $M_n2$ to the SynchLink chip. At Tm2 SynchLink chips in each node (n) present a snapshot of multiplexed data $M_{n-1}1$ to their host processors, and lock multiplexed data $M_n2$ to transmit.

Figure 10:
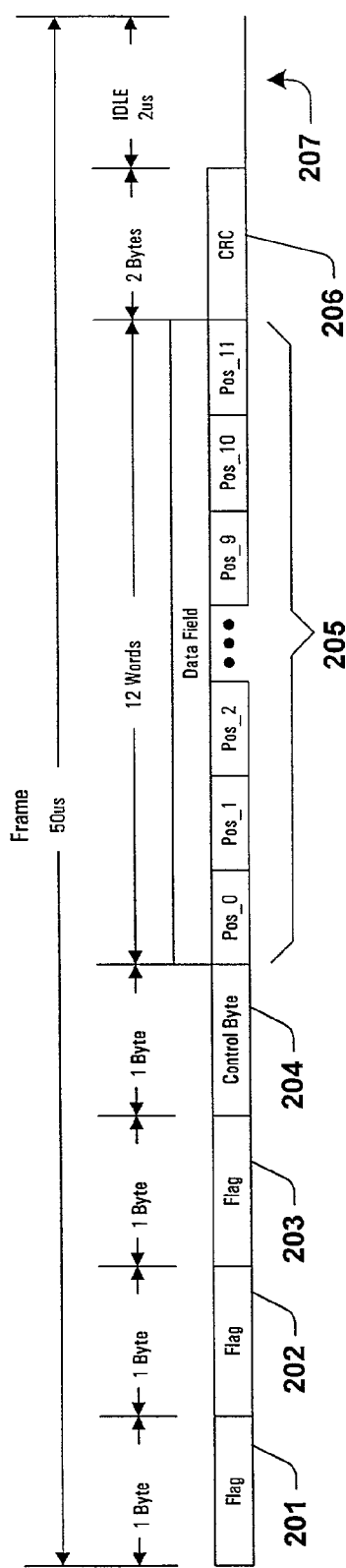
FIG. 10 is a schematic diagram illustrating an exemplary communications protocol message frame in accordance with another aspect of the invention.
Figure 11:
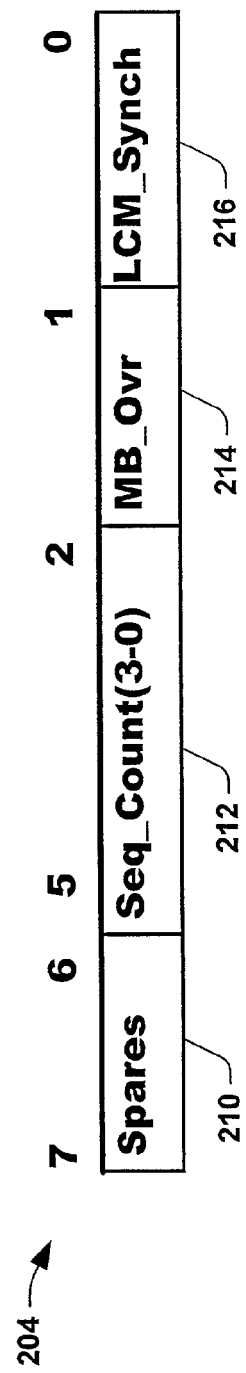
FIG. 11 is a schematic diagram illustrating an exemplary control byte from the exemplary communications protocol frame of FIG. 10 in accordance with another aspect of the invention.

Referring now to FIGS. 10 and 11, the transfer or synchronization information and data between synchronization components can be accomplished using a variety of protocols, for example, wherein datagrams or message frames are sent through a synchronization or other network communications channel periodically. Many such messages can be sent, for instance, at a fixed period, such as 50 µs, wherein a timing system associated with the receiving synchronization components and controllers associated therewith can be adjusted according to the fixed period. At a least common multiple (LCM) period, one such frame can comprise an LCM synch bit indicating an LCM tone, where the message frames comprising the LCM bit are sent according to the LCM period (e.g., 600 ms).

When received, a controller and/or synchronization slave component can adjust a timing system associated with the controller accordingly. For example, the receipt of the LCM indication (e.g., via an active LCM synch bit in the message frame) can be used by a synchronization chip to interrupt a host processor in the synchronization component. The processor can then compare its internal time counter value with the synchronization master actual time value (e.g., provided in a previous message frame or frames), and ramp its timer accordingly, so as to align the synchronization component's internal LCM with that of the synchronization master.

The data in the message frames can include direct data and multiplexed data, wherein the amount of direct data and the amount of multiplexed data in the frame is configurable. The frame can comprise a data field segmented into a direct data portion and a multiplexed data portion according to the configuration. Direct data can thus be transmitted in single frames (e.g., presented to a host processor associated with the receiving synchronization component every 50 µs or at a configurable multiple thereof), whereas multiplexed or package data is transferred in more than one message frame (e.g., presented to the host processor at a programmable multiple of the frame transfer rate, such as every ten frames or 500 µs).

A portion of the multiplexed (e.g., package) data in the data field of the frame can be employed for transmission of configuration and timing information (e.g., such as a configuration ID portion, a status portion, a CST sequence count portion, a CST value portion, an offset portion, and a time master ID portion), and the number of words of direct and multiplexed data can be configurable (e.g., between 0 and 4 words and between 0 and 32 words, respectively, wherein 2 words of the multiplexed data is used for time and configuration data), wherein the sizes of the direct data portion and the multiplexed data portion are determined according to the configuration ID portion.

The protocol can further employ sending a plurality of frames at a fixed period using data flooding wherein at least a portion of the data is sent in more than one frame. In this manner, the invention provides for robust data transfer in a unidirectional high-speed serial synchronization network, without the additional overhead of acknowledgements, retransmissions, etc. It will be further appreciated that where the synchronization network comprises fiber optics, that relatively error free transmission can be achieved, and that the use of data flooding can provide for additional mitigation of transmission errors. The protocol can further provide for simultaneous presentation of synchronization information and data to the host processors associated with the synchronization components in a variety of configuration topologies, such as star, daisy-chain, and loop topologies, as well as combinations thereof.

An exemplary message frame 200 is illustrated in FIG. 10, which can be employed in implementing one or more aspects of the present invention. For instance, the transfer of synchronization information between synchronization components can be accomplished using unidirectional data transfers, wherein the synchronization components can transmit (broadcast) a frame every 50 μs or some other fixed time period. Where the transmission is point-to-point unidirectional, addressing, acknowledgements and retransmissions need not be supported. Reliability can be accomplished using data flooding, for example, wherein data is sent a number of times to ensure error free receipt by the destination synchronization component.

The exemplary communications frame 200 comprises three opening flag bytes 201, 202, and 203 comprising one byte of information each, and a control byte 204. The flag bytes 201–203 can be employed by a receiver to synchronize with the sender of the frame 200, wherein the bytes 201–203 form a known bit pattern such that the receiver will know where it is at in the message frame 200. A data field 205 is included within the frame 200, having twelve 16 bit words of data (e.g., six 32 bit words), a 2 byte CRC check 206, and 2 μs of idle time 207. The CRC (cyclical redundancy checking) check 206 can be used by the receiving synchronization component to ensure the accuracy of transmitted data and synchronization information. For example, the transmitted messages can be divided into predetermined lengths which, used as dividends, are divided by a fixed divisor. The remainder of the calculation is appended onto and sent with the message as the 2 byte CRC check 206. The receiving synchronization component may then recalculate the remainder. If it does not match the transmitted remainder, an error is detected. The synchronization devices receiving the frame 200 can use the length thereof (e.g., 50 μs) in order to synchronize their internal clocks to the clock of the time master in a synchronization system. The control byte 204 can be employed to pass hardware information to a downstream device and is sent as the first byte before the 12-word data field, as illustrated in FIG. 10.

Referring also to FIG. 11, the control byte 204 comprises two spare bits 210, and four Seq_Count bits 212, which are active when multiplexed or package data is being sent. In this case, the value of the Seq_Count 212 represents which particular sequence of data is included in the message. For example, because the multiplexed data is sent in pieces, the Seq_Count 212 can be used to indicate which piece of the data is in a particular frame, wherein the data is reconstructed from the individual pieces received. In this fashion, the Seq_Count 212 value can be used, for example, to determine which piece of package data is missing, or has arrived with an error. In this regard, it will be noted that the data flooding technique can be used to allow a receiver of an erroneous piece of package data to replace the bad data with a subsequent (e.g., error-free) receipt of the same piece.

The control byte 204 further comprises a multiplier overflow bit MB_Ovr 214, for use in the case where a multiplier block in the synchronization device chip is used to multiply data being sent to the downstream device. For example, the multiplier block result included in an outgoing message frame can include an overflow, in which case the MB_Ovr bit 214 can be set active, whereby the device receiving such data will be able to determine whether or not to use it. The MB_Ovr bit 214 can also be set where the incoming frame indicates an overflow bit in the data received from an upstream device, whereby the MB_Ovr bit 214 is also set in the outgoing frame (e.g., whether or not an overflow occurs in the current device (e.g., outgoing overflow bit MB_Ovr 214 is the logical ORing of the local overflow determination and the incoming overflow bit). In association with synchronizing control devices in a control system, as illustrated and described above, the exemplary control byte 204 further comprises an LCM_Synch bit 216. The LCM_Synch bit 216 is set active on the particular message that corresponds to the LCM roll-over of the system time, whereby the receiving synchronization component receives an LCM "pulse" or "tone".

A host processor in the synchronization component can be interrupted upon receipt of the LCM pulse or tone (e.g., receipt of a frame 200 having the LCM_Synch bit 216 set active), whereby the host processor can synchronize with the system time master generating the tone. The synchronization master can send one or more message frames having a CST value for use by slave synchronization components upon receipt of the next LCM tone, as indicated by the LCM indicator bit 216. Upon receipt thereof, the slaves then use the previously received CST value as the actual time. In this manner, the slaves within the same time zone as the master may be in absolute synchronization with the master, and slaves in other synchronization time zones can use the master's actual time to calculate or compute a network offset, for subsequent use in providing absolute time synchronization for control components in different time zones.

The data field 205 of the frame 200 includes a message or datagram having twelve 16 bit words (e.g., six 32-bit words). In one implementation of the invention, a datagram or message frame is sent every 50 μs. Two or more 32 bit words can be used to send a data package of up to 32 32 bit words at a slower rate, referred to herein as package data or multiplexed data, wherein the multiplexed data is sent in more than one message frame. Data, which is sent every 50 μs, is referred to as "direct data". The multiplexed or package data can also comprise information to support time synchronization, a configuration identifier so that the receiver can check that the data received matches the expected configuration, and/or other data structures such as event triggers.

The exemplary SynchLink chip included with a synchronization module or component can further support additional features related to direct data. For example, pass through operation provides the ability to configure the chip to copy direct data from the receive buffer to the transmit buffer before each frame transmission. This feature can be configured on a word by word basis. In addition, a multiplier feature provides the ability to apply a multiplier to a word of direct data as it is being passed through a node. To use this feature, a user can specify which direct word is to be used and provide one or more tags, for example, such as the numerator and denominator of the desired multiplier.

In order to provide for the transmission of larger blocks of data, the invention allows two or more of the 32 bit words in the data field 205 to be configured to multiplex a block of up to thirty-two 32 bit words (e.g., Multiplexed or Package Data) across a plurality of message frames. The synchronization component can be configured to a variety of different modes of operation, wherein different numbers of words are employed in the data field 205 for different data types (e.g., direct or package data). To insure that both the sender and receiver interpret the data in the same way, the configuration identification can be included with the data. In one exemplary implementation, each configuration uses at least the first two words for multiplexed data. In addition, the first two words of the multiplexed data can be employed to send the configuration and synchronization data. As noted above, the synchronization information can also comprise the LCM_Synch bit 216 of the control byte 204 of FIGS. 10 and 11, as well as the length (e.g., in time) of the message frames and/or the period of message frame transmission. In the exemplary implementation illustrated and described herein, the configuration data is sent in the first two words of the messages with the multiplex index (e.g., the sequence count) equal to zero.

Figure 12:
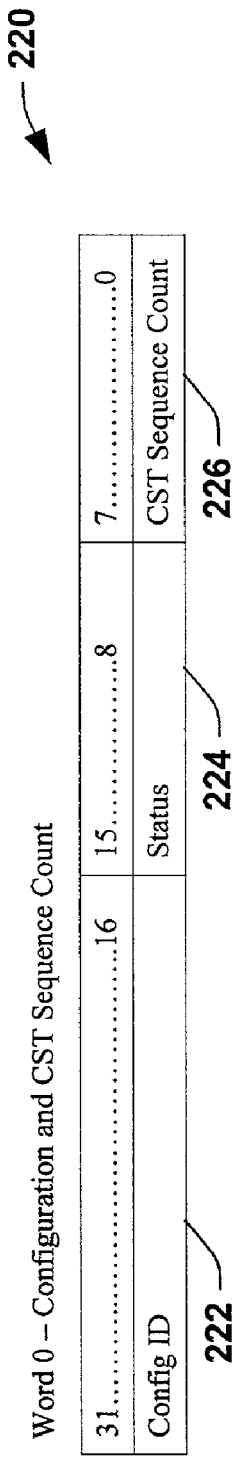
FIG. 12 is a schematic diagram illustrating a portion of an exemplary multiplexed data word 0 in accordance with the invention.
Figure 13:
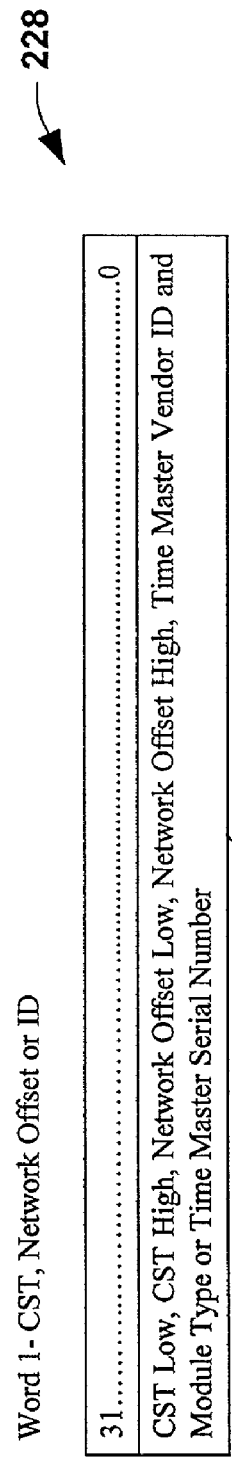
FIG. 13 is a schematic diagram illustrating a portion of an exemplary multiplexed data word 1 in accordance with the invention.

In the common (e.g., non-user) portion of the multiplexed (e.g., package) data illustrated in FIGS. 12 and 13, Word 0 220 comprises a config ID 222, which indicates the configuration of the source synchronization component, a status field 224 indicating the status of an upstream device, and a CST sequence count byte 226 used to indicate the type of information in the second word 228 of FIG. 13. The configuration information 222 includes bits 16–31, and the status byte 224 can be used to indicate the following information: Bit 8—Source processor in Run mode (e.g., for daisy-chain topologies, this bit can be the logical AND of the mode of the local processor and the upstream mode); Bits 9–12—reserved; Bit 13—CST Valid; Bit 14—Network Offset Valid; Bit 15—Time Relay Inactive, wherein the Sequence Count is zero.

The CST sequence count byte 226 comprises bits 0–7, which can be employed to indicate the type of data in Word 1 228 of FIG. 13. For example, the sequence count byte 226 can indicate the following information regarding Word 1 228: 0—No Time Data; 1—CST Low—Bits 0 to 31 of CST; 2—CST High—Bits 32 to 63 of CST; 3—Network Offset Low—Bits 0 to 31 of Network Offset; 4—Network Offset High—Bits 32 to 63 of Network Offset; 5—Time master Vendor ID and Module Type; 6—Time master Serial Number. FIG. 13 illustrates Word 1 228, wherein bits 0–31 229 can be used alternatively for the lower or higher 32 bit CST value word (e.g., absolute time information, network offset high/low word information (e.g., for comparing time stamp values for inputs from a controlled system), and/or for identification information relating to the master synchronization component (e.g., time master vendor ID and module type or time master serial number, etc.). For example, the CST (e.g., high and low words) can comprise a 64 bit counter based on a 1 $\mu$s period providing an actual time value for use in synchronizing controllers within a single synchronization time zone (e.g., or across multiple time zones).

Referring also to FIG. 14, a table 230 is illustrated having entries for an exemplary set of eighteen configuration options available in the exemplary implementation. The configuration options allow the relative amounts of direct and multiplexed data to be configurable by a user, for example, wherein the direct data portion of a message frame data field can be set between 0 and 4 words (e.g., 32 bit words) and the multiplexed data portion thereof can be between 0 and 32 words (e.g., wherein words 0 and 1 are used for non-user information as illustrated in FIGS. 12 and 13). In the case where the M-scan rate is set to 500 $\mu$s, the cases listed in FIG. 14 having a multiplex time of 250 $\mu$s will allow the multiplexed data to be sent twice during the M-scan, in order to provide data flooding. This data flooding ensures that the data will get through, by sending the data at least twice. For the cases in which the multiplex time is 500 $\mu$s, the multiplexed data will only be sent once during each M-scan.

Figure 15:
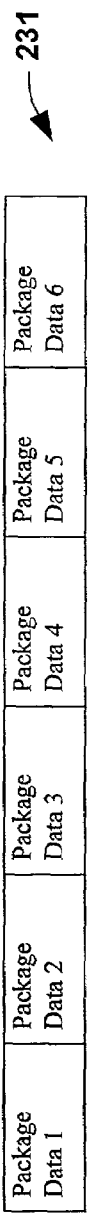
FIG. 15 is a schematic diagram illustrating an exemplary message frame data field associated with a configuration option in accordance with the invention.

Referring now to FIGS. 14–31, the following is a detailed description of each user configuration option in the exemplary implementation. Option 0 (e.g., the first entry in the table 230 of FIG. 14) is a special case, which can be employed for devices that do not participate in any data transfers via the time synchronization system, but rather use the system only for LCM synchronization. These devices will load all six words of the datagram with zeros. Any device that receives this data, regardless of their own configuration, will detect the configuration identifier of zero and not use the data. Configuration option 1 231 is illustrated in FIG. 15, wherein the entire data field is used for the multiplexed data (e.g., there is no direct data). The multiplexed data is 30 32 bit words long and is thus sent every 250 $\mu$s (e.g., six words per message frame, each sent twice in 500 $\mu$s). The message frame data field has the format illustrated in FIG. 15, and the multiplexed data has the following format: Configuration & Time Data—words 0 & 1; Remote Axis 0 Data—14 32 bit words—words 2 thru 15; Remote Axis 1 Data—14 32 bit words—words 16 thru 29.

Figure 16:
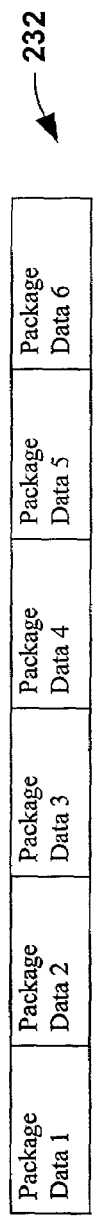
FIG. 16 is a schematic diagram illustrating a message frame data field associated with another configuration option in accordance with the invention.
Figure 17:
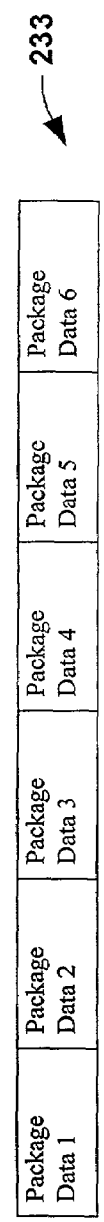
FIG. 17 is a schematic diagram illustrating a message frame data field associated with another configuration option in accordance with the invention.

Configuration option 2 232 is illustrated in FIG. 16. For option 2, the entire message frame data field is used for the multiplexed data. There is no direct data. The multiplexed data is 30 32 bit words long and is thus sent every 250 $\mu$s. The data field has the format illustrated in FIG. 16, and the multiplexed data has the following format: Configuration & Time Data—words 0 & 1; Remote Axis 0 Data—14 32 bit words—words 2 thru 15; multiplexed data—14 32 bit words—words 16 thru 29. Configuration option 3 233 is illustrated in FIG. 17, wherein the entire data field is used for the multiplexed data. There is no direct data. The multiplexed data is 30 32 bit words long and is thus sent every 250 $\mu$s, wherein the data field has the format illustrated in FIG. 17 and the multiplexed data has the following format: Configuration & Time Data—words 0 & 1; and multiplexed data—28 32 bit words—words 2 thru 29.

Configuration option 4 234 is illustrated in FIG. 18, wherein the first five 32 bit words of the data field are used for the multiplexed data and the last 32 bit word of the data field is used for direct data. The multiplexed data is 25 32 bit words long and is thus sent every 250 $\mu$s. The data field format is illustrated in FIG. 18 and the multiplexed data has the following format: Configuration & Time Data—words 0 & 1; Remote Axis 0 Data—14 32 bit words—words 2 thru 15; multiplexed data—9 32 bit words—words 16 thru 24. Configuration option 5 235 is illustrated in FIG. 19, wherein the first five 32 bit words of the data field are used for the multiplexed data, and the last 32 bit word of the data field is used for direct data. The multiplexed data is 25 32 bit words long and is thus sent every 250 $\mu$s. The data field has the format illustrated in FIG. 19, and the multiplexed data has the following format: Configuration & Time Data—words 0 & 1; multiplexed data—23 32 bit words—words 2 thru 24. FIG. 20 illustrates configuration option 6 236, wherein the first four 32 bit words of the data field are used for the multiplexed data, and the last two 32 bit words of the data field are used for direct data. The multiplexed data is 20 32 bit words long and is thus sent every 250 µs. The data field has the format illustrated in FIG. 20, and the multiplexed data has the following format: Configuration & Time Data—words 0 & 1; Remote Axis 0 Data—14 32 bit words—words 2 thru 15; multiplexed data—4 32 bit words—words 16 thru 19.

FIG. 21 illustrates configuration option 7 237, wherein the first four 32 bit words of the data field are used for the multiplexed data, and the last two 32 bit words of the data field are used for direct data. The multiplexed data is 20 32 bit words long and is thus sent every 250 µs. The data field has the format illustrated in FIG. 21 and the multiplexed data has the following format: Configuration & Time Data—words 0 & 1; and multiplexed data—18 32 bit words—words 2 thru 19. Configuration Option 8 238 is illustrated in FIG. 22, wherein the first three 32 bit words of the data field are used for the multiplexed data, and the last three 32 bit words of the data field are used for direct data. The multiplexed data is 15 32 bit words long and is thus sent every 250 µs. The data field has the format illustrated in FIG. 22 and the multiplexed data has the following format: Configuration & Time Data—words 0 & 1; and multiplexed data—13 32 bit words—words 2 thru 14. FIG. 23 illustrates configuration option 9 239, wherein the first two 32 bit words of the data field are used for the multiplexed data. The last four 32 bit words of the data field are used for direct data. The multiplexed data is 10 32 bit words long and is thus sent every 250 µs. The data field has the format illustrated in FIG. 23, and the multiplexed data has the following format: Configuration & Time Data—words 0 & 1; and multiplexed data—8 32 bit words—words 2 thru 9.

Configuration option 10 240 is illustrated in FIG. 24, wherein the first four 32 bit words of the data field are used for the multiplexed data, and the last two 32 bit words of the data field are used for direct data. The multiplexed data is 32 32 bit words long and is thus sent every 500 µs, wherein the data field has the format illustrated in FIG. 24 and the multiplexed data has the following format: Configuration & Time Data—words 0 & 1; Remote Axis 0 Data—14 32 bit words—words 2 thru 15; Remote Axis 1 Data—14 32 bit words—words 16 thru 29; and multiplexed data—2 32 bit words—words 30 & 31. Configuration Option 11 241 is illustrated in FIG. 25, wherein the first four 32 bit words of the data field are used for the multiplexed data, and the last two 32 bit words of the data field are used for direct data. The multiplexed data is 32 32 bit words long and is thus sent every 500 µs. The data field has the format illustrated in FIG. 25 and the multiplexed data has the following format: Configuration & Time Data—words 0 & 1; Remote Axis 0 Data—14 32 bit words—words 2 thru 15; and multiplexed data—16 32 bit words—words 16 thru 31. Configuration option 12 242 is illustrated in FIG. 26, wherein the first four 32 bit words of the data field are used for the multiplexed data, and the last two 32 bit words of the data field are used for direct data. The multiplexed data is 32 32 bit words long and is thus sent every 500 µs. The data field has the format illustrated in FIG. 26, and the multiplexed data has the following format: Configuration & Time Data—words 0 & 1; and multiplexed data—30 32 bit words—words 2 thru 31.

Figure 27:
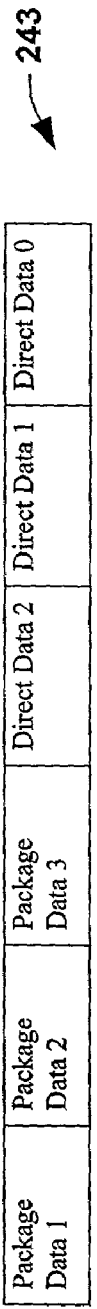
FIG. 27 is a schematic diagram illustrating a message frame data field associated with another configuration option in accordance with the invention.
Figure 28:
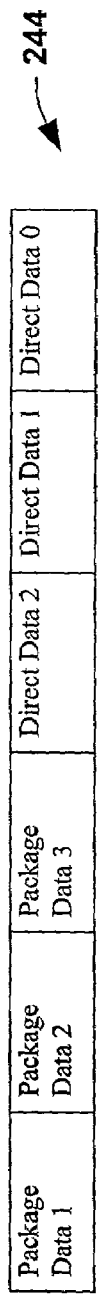
FIG. 28 is a schematic diagram illustrating a message frame data field associated with another configuration option in accordance with the invention.
Figure 29:
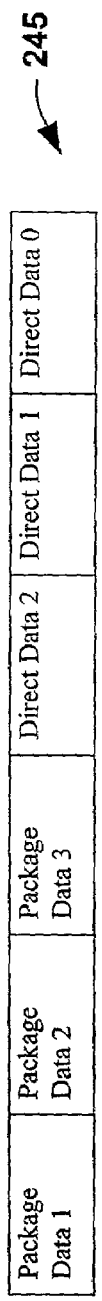
FIG. 29 is a schematic diagram illustrating a message frame data field associated with another configuration option in accordance with the invention.

Configuration option 13 243 is illustrated in FIG. 27, wherein the first three 32 bit words of the data field are used for the multiplexed data, and the last three 32 bit words of the data field are used for direct data. The multiplexed data is 30 32 bit words long and is thus sent every 500 µs, wherein the data field has the format illustrated in FIG. 27 and the multiplexed data has the following format: Configuration & Time Data—words 0 & 1; Remote Axis 0 Data—14 32 bit words—words 2 thru 15; and Remote Axis 1 Data—14 32 bit words—words 16 thru 29. Configuration option 14 244 is illustrated in FIG. 28, wherein the first three 32 bit words of the data field are used for the multiplexed data, and the last three 32 bit words of the data field are used for direct data. The multiplexed data is 30 32 bit words long and is thus sent every 500 µs, wherein the data field has the format illustrated in FIG. 28 and the multiplexed data has the following format: Configuration & Time Data—words 0 & 1; Remote Axis 0 Data—14 32 bit words—words 2 thru 15; and multiplexed data—14 32 bit words—words 16 thru 29. In FIG. 29, configuration option 15 245 is illustrated in which the first three 32 bit words of the data field are used for the multiplexed data, and the last three 32 bit words of the data field are used for direct data. The multiplexed data is 30 32 bit words long and is thus sent every 500 µs, wherein the data field has the format illustrated in FIG. 29, and the multiplexed data has the following format: Configuration & Time Data—words 0 & 1; and multiplexed data—28 32 bit words—words 2 thru 29.

Configuration option 16 246 is illustrated in FIG. 30, in which the first two 32 bit words of the data field are used for the multiplexed data, and the last four 32 bit words of the data field are used for direct data. The multiplexed data is 20 32 bit words long and is thus sent every 500 µs. The data field has the format illustrated in FIG. 30 and the multiplexed data has the following format: Configuration & Time Data—words 0 & 1; Remote Axis 0 Data—14 32 bit words—words 2 thru 15; and multiplexed data—4 32 bit words—words 16 thru 19. In FIG. 31, configuration option 17 is illustrated, in which the first two 32 bit words of the data field are used for the multiplexed data, and the last four 32 bit words of the data field are used for direct data. The multiplexed data is 20 32 bit words long and is thus sent every 500 is, wherein the data field has the format illustrated in FIG. 31, and the multiplexed data has the following format: Configuration & Time Data—words 0 & 1; and multiplexed data—18 32 bit words—words 2 thru 19.

Another aspect of the present invention is illustrated described hereinafter with respect to FIGS. 32–33, wherein exemplary implementations of hardware associated with the synchronization components or modules are shown. The synchronization apparatus and devices according to the invention can be employed in associated with rack mounted controllers, for example, in a synchronization module communicating with control modules in a common control chassis (e.g., via a backplane communications bus or the like), and/or in association with stand-alone controllers, such as motor drives and the like. In this regard, it will be appreciated that the synchronization systems and apparatus illustrated herein are examples of specific implementations of one or more aspects of the invention, and that other such implementations apart from those illustrated and/or described herein are contemplated as falling within the scope of the present invention.

Figure 32:
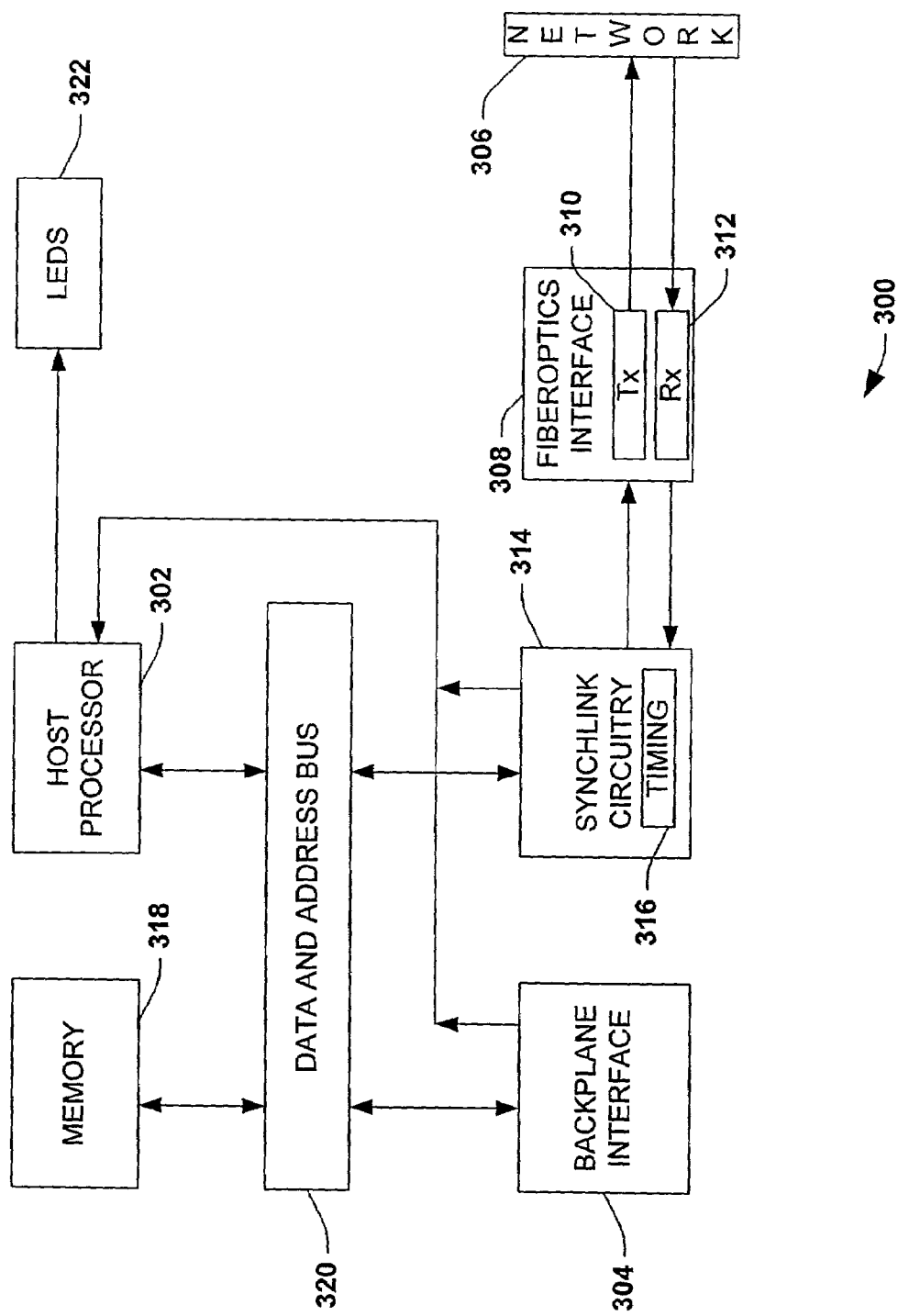
FIG. 32 is a schematic diagram illustrating an exemplary synchronization module in accordance with another aspect of the present invention.

Referring initially to FIG. 32, an exemplary synchronization module 300 is schematically illustrated for synchronizing operation of two or more controllers in a control system. The module 300 can be employed, for example, in a control chassis (not shown) together with one or more control modules and other associated modules as are know, for example, such as I/O modules, power supply modules, communications modules, and the like. The module 300 advantageously allows synchronization information to be transferred between one or more controllers in the control chassis and controllers (e.g., stand-alone or chassis-based) outside the chassis. The module 300 comprises a host processor 302 operatively associated with a backplane interface 304 allowing communication with one or more controllers (e.g., control modules) via a backplane bus (not shown) in the control chassis, for example, via a synchronization or general purpose communications network.

The module 300 interacts with a fiber optic synchronization network 306 via a fiber optic interface circuit 308 having a transmitter 310 adapted to transmit synchronization information and data to the network 306, and a receiver 312 adapted to receive synchronization information and data from the network 306. A synchronization (e.g., Synchlink) circuit 314 is operatively associated with the interface 308 and the host processor 302 and comprises a timing system 316. The circuit 314 can comprise, for example, an integrated circuit, processor, logic device, or other processing device, such as a field programmable gate array (FPGA) or the like, and can be programmed to perform the various functions described herein. For example, the Synchlink circuit or chip 314 is configurable by the host processor 302 to operate the synchronization module 300 as a synchronization master or a synchronization slave. The timing system 316 can comprise a clock (not shown) used to maintain an indication of time according to information received from the network 306 (e.g., where the module 300 is configured as a synchronization slave) or from the host processor 302 (e.g., wherein the module 300 is configured as a synchronization master).

The host processor 302 is connected with a memory 318 via a bus 320, which can comprise separate and/or shared address and data busses, as well as with one or more visual indicators such as LEDs 322 for indicating status and other conditions associated with the module 300 to a user. The memory 318 can be used for storing data and program code executed by the host processor 302 and/or the synchlink circuit 314 for carrying out various functions described herein. The actual code for performing such functions could be easily programmed by a person having ordinary skill in the art of computer programming in any of a number of conventional programming languages based on the disclosure herein. Consequently, further detail as to the particular code is omitted for sake of brevity.

Referring also to FIG. 2, the exemplary synchronization module 300 of FIG. 32 operates in a manner similar to that of synchronization components 82, 100, 102, and/or 108 as illustrated and described above for synchronizing the operation of one or more controllers (e.g., control modules 72, 85, 90, 94), I/O modules (e.g., I/O modules 73, 74, 86, 87, 95, and/or 91), or other modules in a control system. In addition, the synchronization module can be employed in control systems having one or more stand-alone control devices (e.g., process controllers, motor drives, etc.) connected with the synchronization network 306 for sending and receiving synchronization information (e.g., and data) in order to temporally synchronize operations performed by such control modules and/or stand-alone control devices. Moreover, the module 300 can interface with conventional networks (e.g., CONTROLNET, Ethernet, etc.) whereby synchronization information can be transferred therethrough (e.g., communications network 80), alternatively or in combination with transfer of such via a dedicated (e.g., high-speed) synchronization network (e.g., networks 84, 106, 306).

The invention further provides synchronization circuitry which can be employed in a synchronization module (e.g., module 300) and/or in a stand-alone control device, for synchronizing operation thereof with other control devices in a control system. For example, the synchronization circuitry can be included in a dedicated purpose synchronization integrated circuit (IC) chip for use in such modules or stand-alone devices. The circuitry can thus be adapted to interface with communications networks (e.g., general purpose and/or dedicated synchronization networks) as well as with chassis-based control modules or stand-alone controllers. For instance, the synchronization chip can be included within a single board controller, or on a daughter board in a stand-alone control device, and operative to interface with other components within such a device (e.g., processors, memory, and the like). Similarly, the synchronization (e.g., synchlink) chip can be employed as a component in a synchronization module (e.g., modules 82, 100, 102, 104, and/or 108) having communications interfaces, host processors, and the like, for synchronizing control modules in a control chassis with other control devices outside the chassis.

Figure 33:
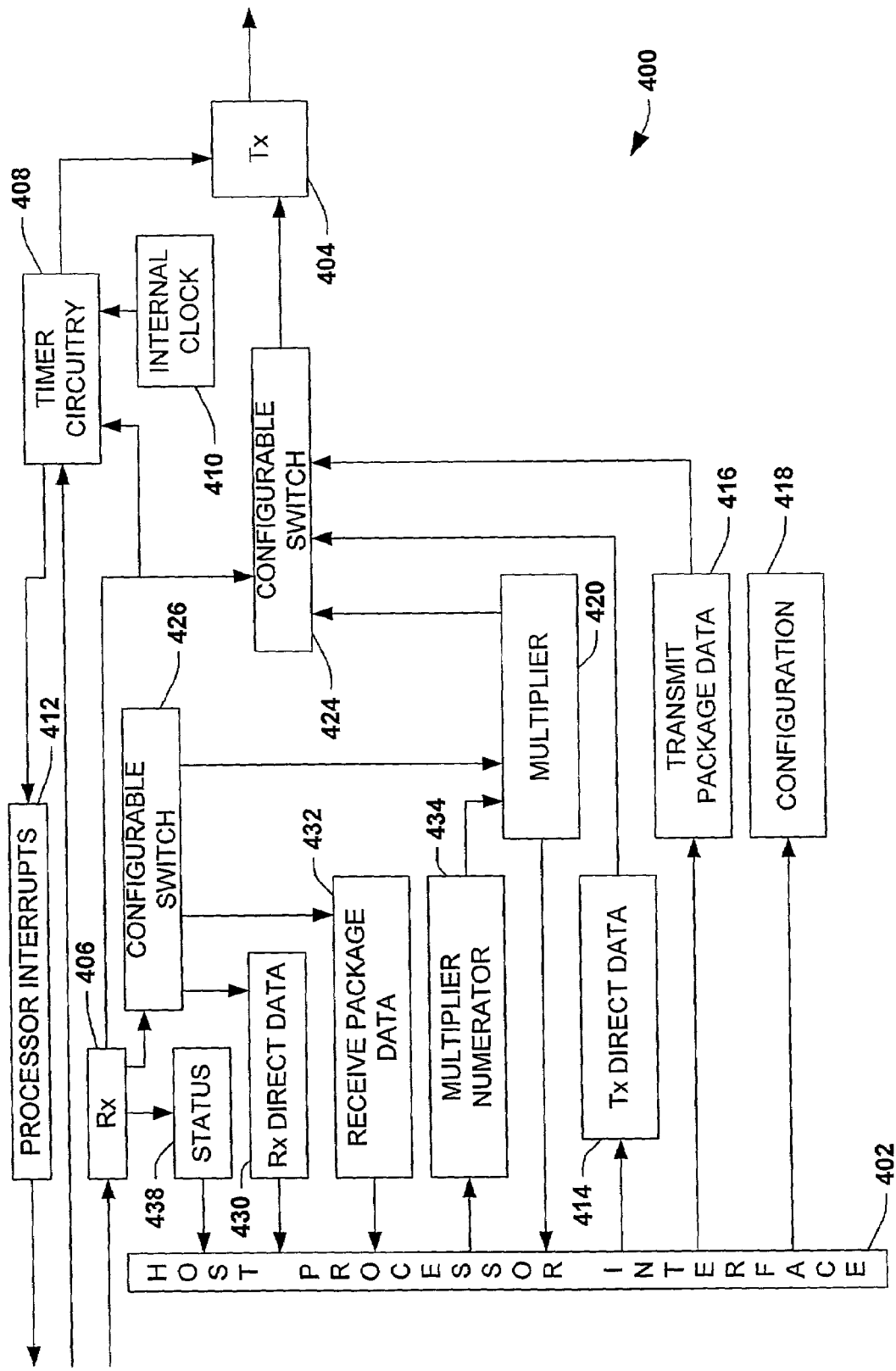
FIG. 33 is a schematic diagram illustrating an exemplary synchronization circuit in accordance with the invention.

An exemplary synchronization circuit 400 is illustrated in FIG. 33, comprising a processor interface 402 for interfacing with a host processor (e.g., host processor 302 of FIG. 32), a transmitter component 404 adapted to transmit synchronization information and data to a network in a control system (e.g., synchronization networks 84, 106, 306, and/or communications network 80), and a receiver component 406 adapted to receive synchronization information and data from the network. The transmitter and receiver components 404 and 406 can be operatively connected to appropriate network interface apparatus (e.g., fiber optics interface 308 of FIG. 32) for sending and receiving information, respectively, to or from a network. A timer circuit or system 408 is provided along with a clock 410, which maintains an indication of time according to information received from the network and/or the associated host processor. The circuit 400 can be operatively associated with the host processor via the interface 402 and configurable by the host processor to operate as a synchronization master or a synchronization slave.

The timer circuit 408 provides timing information for synchronization of transmissions via the transmitter component 404 and provides interrupts 412 to the host processor in certain situations as described in greater detail hereinafter. The timer circuit 408, moreover, can obtain synchronization information from the receiver component 406, which can be used to adjust the indication of time therein. For example, counters, clocks, timers, etc. in the timer system 408 (e.g., and/or the internal clock 410) can be adjusted according to synchronization or time information from the network (e.g., via the receiver component 406) or the host processor. Thus, where the circuit 400 is configured as a synchronization master, such timing and/or synchronization information can be obtained from the host processor and sent to other networked synchronization components. Where configured as a synchronization slave, such can be obtained from the networked master, via the receiver component 406.

The circuit 400 receives direct data 414, multiplexed (e.g., package) data 416, and configuration data 418 from the host processor via the interface 402, wherein the configuration data or information 418 is used to determine the operation of the circuit 400, for example, master or slave operation, multiplier operation associated with a hardware multiplier system 420, network topology type, pass-thru transmission, and other operational characteristics. The transmitter and receiver components 404 and 406 are respectively connected to corresponding configurable switch systems 424 and 426, which can operate in accordance with the configuration information 418 from the host processor. For example, depending on the configuration information 418, the configurable switch 424 can selectively provide data to the transmitter component 404 from one or more of the direct data 414 and/or the package (e.g., multiplexed) data 416 from the host processor, the multiplier 420, or directly from the receiver component 406 for pass-thru data transfer.

Similarly, the configurable switch 426 associated with the receiver component 406 selectively transfers data or information from the receiver component 406 to the host processor or the multiplier 420. For instance, the switch 426 can provide or present received direct data 430, and/or received package data 432 from the receiver component 406 to the host processor via the interface 402, such as at individually configurable presentation intervals therefor. The multiplier 420 can receive a multiplier numerator 434 or other multiplication value from the host processor interface 402, which can then be multiplied with received direct data from the receiver component 406. The multiplication result value is then transmitted to the network via switch 424 and transmitter component 404, and can additionally be provided to the host processor via the interface 402. The receiver component 406 can also provide status information 438 to the host processor via the interface 402 (e.g., such as information obtained from status byte 224 of FIG. 12), for example, indicative of the status of one or more synchronization components in a networked system (e.g., an upstream device), and/or communications errors 42 (e.g., an error counter value).

The circuit 400 is thus programmable or configurable to operate in a variety of fashions according to the configuration information 418 from the host processor. For example, the transmitter component 404 can be configured via the switch 424 to periodically transmit message frames comprising direct data 416 or pass-thru direct data from the receiver component 406. Consequently, the circuit 400 can provide pass-thru operation, for example, in a daisy-chain or ring topology without the time penalty of presentation of the direct data to the host processor in each node, or alternatively operate as a master, wherein the direct data 414 transmitted originates with the host processor. Another option employs the multiplier 420, wherein the received direct data is multiplied using the numerator 434 from the host processor, and sent to the transmitter component 404.

This may be employed, for example, in order to provide successively (e.g., proportionally) increased speed signals to a series of motor drive control devices, such as in a daisy-chain topology. In this regard, the transmitter component 404 can be configured via the switch 424 to periodically transmit message frames comprising direct data from the multiplier 420, wherein the transmitted direct data is the product of received direct data from an upstream device (e.g., via receiver component 406 and switch 426) and the numerator 434 from the host processor. It will be appreciated that the provision of hardware multiplier 420 facilitates such operation without intervention by the host processor in order to multiply the value from the received direct data. The multiplication result value can also be provided to the host processor via the interface 402.

The multiplier 420 can comprise integer multiplication circuitry, wherein the numerator 434 from the host processor is a 16 bit binary value, and wherein a fixed denominator (e.g., 8000H) is used in the multiplier 420. In this implementation, the multiplier numerator 434, together with the fixed denominator, allows multiplication of the direct data value from the receiver component 406 and the switch 426 by a value between zero and two. As described above, overflow in the multiplier 420 can be indicated in the outgoing message frames (e.g., via MB_Ovr bit 214 of control byte 204 of FIGS. 10 and 11) so that downstream devices can selectively refrain from using the resulting value. In this regard, incoming message frames can be scrutinized by the host processor to ascertain if the received control byte has the MB_Ovr bit active, whereby the corresponding output control byte can also have this bit set.

The number of direct data and multiplexed data bytes in the message frames transmitted to the network by the transmitter component 404 can also be adjusted using the configuration information 418 from the host processor (e.g., where the direct data portion can comprise between 0 and 4 words, and the multiplexed data portion can comprise between 0 and 32 words in the exemplary implementation). As indicated above with respect to FIGS. 12 and 13, the incoming message frames received via receiver component 406 can comprise a config id 222 in the multiplexed data of one or more such frames (e.g., FIG. 12), which the host processor can compare with configuration information 418, whereby the host can determine whether its configuration matches that of the sender device (e.g., an upstream synchronization component).

The transmitter component 404 can thus periodically transmit message frames comprising direct data, multiplexed data, and configuration information via the transmitter component 404. The timer 408 and clock 410 provide appropriate timing for such transmission onto the network, for example, whereby the message frames are transmitted at a fixed period of 50 μs. In this fashion, downstream devices can internally calibrate or adjust their own timing systems according to the periodicity of the received frames. For example, where the circuit 400 is configured as a synchronization slave, the data from the receiver component 406 is provided to the timer circuitry 408, which can be used to adjust the timing system (e.g., circuit 408 and/or clock 410) of the synchronization circuit 400 in accordance therewith. Other levels of timing adjustment are possible using the circuit 400. For instance, the receipt of frames having an LCM indication (e.g., LCM_Synch bit 216 of FIG. 11) can be used to interrupt the host processor, which can then employ CST time information (e.g., from word 1 229 in previous message frames, FIG. 13) to accordingly ramp or adjust time values stored in the host processor.

Figure 34:
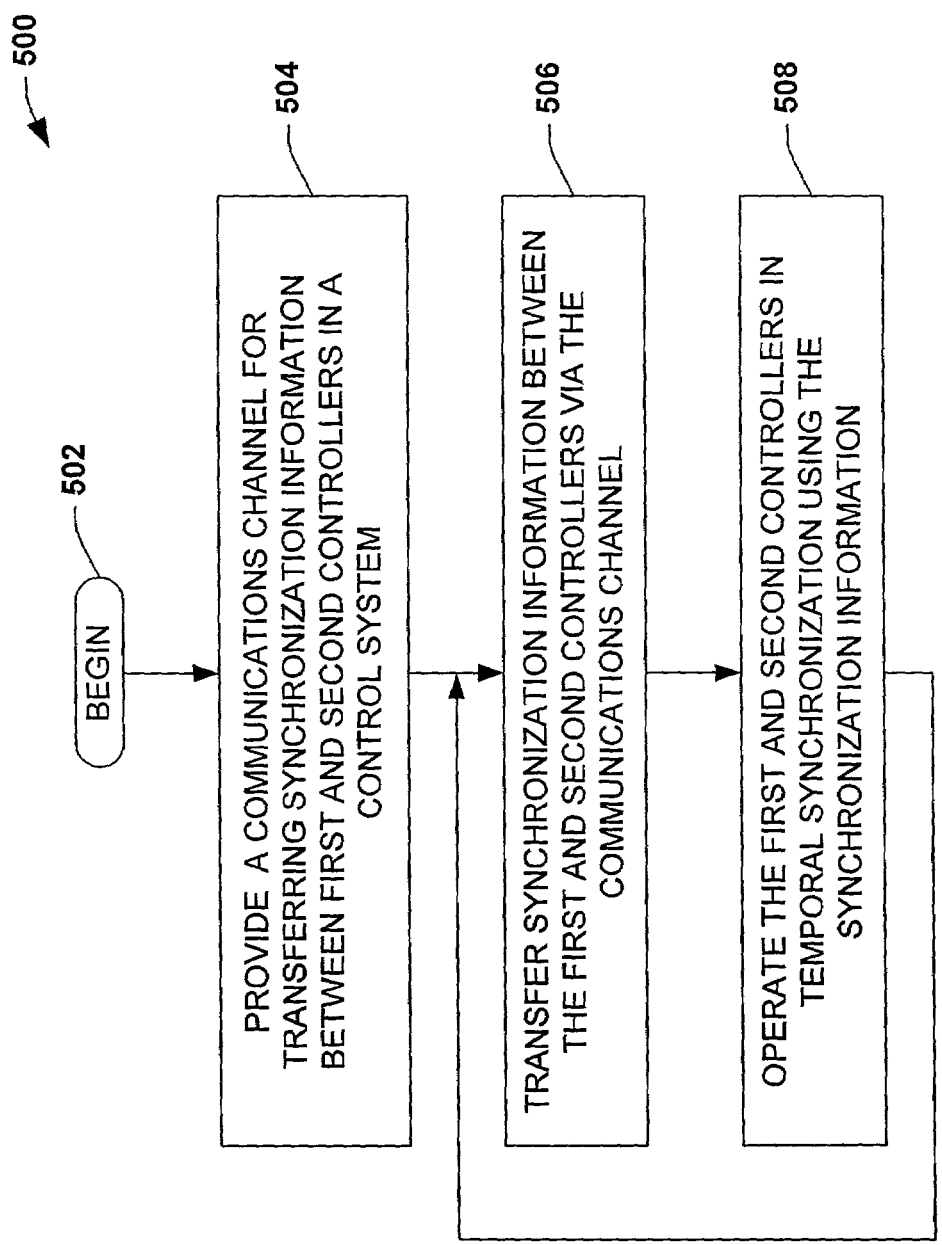
FIG. 34 is a flow diagram illustrating an exemplary method in accordance with another aspect of the present invention.

Referring now to FIG. 34, another aspect of the invention provides techniques and methodologies for temporally synchronizing controllers in a control system. An exemplary method 500 is illustrated beginning at 502. While the exemplary method 500 is illustrated and described herein as a series of blocks representative of various events and/or acts, the present invention is not limited by the illustrated ordering of such blocks. For instance, some acts or events can occur in different orders and/or concurrently with other acts or events, apart from the ordering illustrated herein, in accordance with the invention. Moreover, not all illustrated blocks, events, or acts, may be required to implement a methodology in accordance with the present invention. In addition, it will be appreciated that the exemplary method 500 and other methods according to the invention can be implemented in association with the apparatus and systems illustrated and described herein, as well as in association with other systems and apparatus not illustrated or described.

The method 500 comprises providing a communications channel at 504 for transferring synchronization information between first and second controllers in the control system. At 506, synchronization information is transferred between the first and second controllers via the communications channel, and at 508 the first and second controllers are operated in temporal synchronization using the synchronization information, whereafter the method 500 returns to 506. The provision of a communications channel at 504 can comprise associating the first and second controllers with first and second synchronization components, respectively, and providing a synchronization network interconnecting the first and second synchronization components.

The transfer of synchronization information at 506 can comprise transferring synchronization information from the first synchronization component to the first controller, transferring the synchronization information from the first synchronization component to the second synchronization component using the synchronization network, and transferring the synchronization information from the second synchronization component to the second controller, for example, where the first synchronization component is configured as a synchronization master. In this regard, the synchronized operation of the first and second controllers at 508 can comprise time stamping inputs, scheduling outputs, periodic events, and scheduling events.

The transfer of synchronization information at 506 may further include transferring synchronization information from the first synchronization component at an LCM interval (e.g., 600 ms), such as by the transmission of a message frame comprising an LCM indication. In this regard, the operation at 508 can include performing the time stamping inputs, scheduling outputs, periodic events, and/or scheduling events according to the LCM interval, for example, wherein these are performed at an interval which is a factor of the LCM interval.

Figure 35:
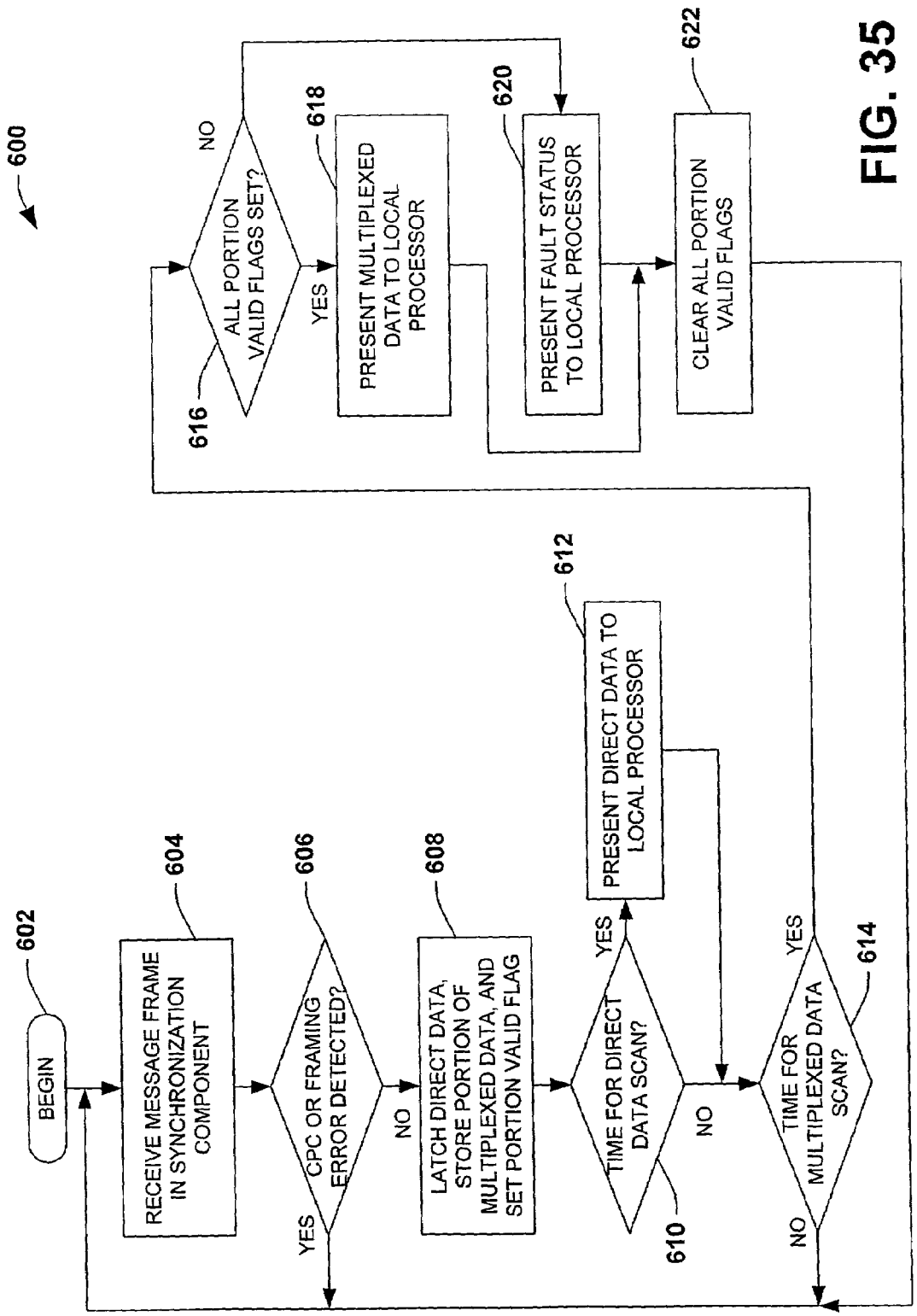
FIG. 35 is a flow diagram illustrating another exemplary method in accordance with the invention.

Referring now to FIG. 35, another aspect of the invention provides a method 600 for transferring data in a control system. Although the exemplary method 600 is illustrated and described herein as a series of blocks representative of various events and/or acts, the present invention is not limited by the illustrated ordering of such blocks. For instance, some acts or events can occur in different orders and/or concurrently with other acts or events, apart from the ordering illustrated herein, in accordance with the invention. Moreover, not all illustrated blocks, events, or acts, may be required to implement a methodology in accordance with the present invention. In addition, it will be appreciated that the exemplary method 600 and other methods according to the invention can be implemented in association with the apparatus and systems illustrated and described herein, as well as in association with other systems and apparatus not illustrated or described.

Beginning at 602, the exemplary method 600 comprises receiving a message frame in a synchronization component at 604 and making a determination at 606 as to whether a CPC or framing error has been detected. If so, the method 600 returns to await receipt of another message frame at 604. If no CPC or framing error is detected at 606, direct data from the message frame is latched, a portion of the multiplexed data in the message frame is stored, and a portion valid flag is set at 608. For instance, the portion valid flag is set if the portion of the multiplexed data in the current message frame is valid. The portion valid flags for the multiplexed data can then be checked at step 616 in determining whether such multiplexed data is to be presented to the host processor. A determination is then made at 610 as to whether the direct data scan time has arrived. If so, direct data (e.g., latched at 608) is presented to the local or host processor at 612 before the method 600 proceeds to 614. If the direct data scan time has not yet arrived at 610, a determination is made at 614 as to whether the multiplexed data scan time has arrived. If not, the method 600 returns to await receipt of another message frame at 604 as described above.

If the multiplexed data scan time has arrived at 614, the portion valid flags for the multiplexed data are checked and a determination is made at 616 as to whether all such flags are set (e.g., thereby indicating valid data for all portions of the multiplexed data). If so, the multiplexed data (e.g., all portions thereof) is presented to the local host processor at 618 and the method 600 proceeds to 622. If one or more of the portion valid flags are not set at 616, a fault status is presented to the local host processor at 620. In either case, the method 600 then proceeds from 618 or 620 to 622, where all portion valid flags are reset or cleared, after which the method 600 returns to 604 to await further message frames as illustrated and described above.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature can be combined with one or more other features of the other implementations as may be desired and advantageous for any given or particular application. As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. Furthermore, to the extent that the terms "includes", "including", "has", "having", and variants thereof are used in either the detailed description or the claims, these terms are intended to be inclusive in a manner similar to the term "comprising."

What is claimed is:

1. A protocol for transferring synchronization information from a first synchronization component to a second synchronization component via a network for time synchronizing operation of first and second controllers associated with the first and second synchronization components, the protocol comprising:

sending a message frame from the first synchronization component to the second synchronization component via the network, the message frame comprising time synchronization information and data;

sending an additional message frame at a fixed period, the additional message frame comprises an LCM synch bit indicating an LCM tone;

receiving the message frame and the additional message frame from the network in the second synchronization component;

synchronizing operation of the second controller with that of the first controller according to the time synchronization information; and adjusting a timing system associated with the second controller according to the LCM synch bit.

2. The protocol of claim 1, wherein synchronizing operation of the second controller comprises adjusting the timing system associated with the second controller according to the fixed period.

3. The protocol of claim 1, the fixed period is about 50 $\mu$s.

4. The protocol of claim 1, further comprising sending the at least one frame comprising the LCM synch bit indicating an LCM tone periodically according to an LCM period.

5. The protocol of claim 3, the LCM period is an integer multiple of the fixed period.

6. The protocol of claim 2, the LCM period is 600 ms.

7. The protocol of claim 1, at least one frame comprises an LCM synch bit indicating an LCM tone, and synchronizer operation of the second controller comprises adjusting a timing system associated with the second controller according to the LCM synch bit.

8. The protocol of claim 1, the data comprises direct data and multiplexed data.

9. The protocol of claim 6, the amount of direct data and the amount of multiplexed data in the frame is configurable.

10. The protocol of claim 6, further comprising sending additional message frames at a fixed period, the frame comprises a direct data portion and a multiplexed data portion, the direct data comprises the direct data portion of a single frame, and the multiplexed data comprises the multiplexed data portions of a plurality of frames.

11. The protocol of claim 8, comprising presenting the direct data from the direct data portion of each frame to a host processor associated with the second synchronization component as frames are received by the second synchronization component and receiving the multiplexed data from the multiplexed data portions of a plurality of message frames.

12. The protocol of claim 9, receiving the multiplexed data from the multiplexed data portions of a plurality of message frames comprises presenting the multiplexed data to a host processor associated with the second synchronization component when the plurality of message frames has been received by the second synchronization component.

13. The protocol of claim 8, receiving the multiplexed data from the multiplexed data portions of a plurality of message frames comprises presenting the multiplexed data to a host processor associated with the second synchronization component when the plurality of message frames has been received by the second synchronization component.

14. The protocol of claim 10, comprising presenting the direct data to the host processor every 50 $\mu$s and presenting the multiplexed data to the host processor every 500 $\mu$s.

15. The protocol of claim 8, the direct data portion comprises between 0 and 4 words, and the multiplexed data portion comprises between 0 and 32 words.

16. The protocol of claim 13, the number of words in the direct data portion and the number of words in the multiplexed data portion are configurable.

17. The protocol of claim 13, the multiplexed data portion comprises between 0 and 30 words of user data and 2 words of time and configuration data.

18. The protocol of claim 8, the multiplexed data portion comprises between 0 and 30 words of user data and 2 words of time and configuration data.

19. The protocol of claim 16, the time and configuration data comprises at least one of a configuration ID portion, a status portion, a CST sequence count portion, a CST value portion, an offset portion, and a time master ID portion.

20. The protocol of claim 17, the sizes of the direct data portion and the multiplexed data portion are determined according to the configuration ID portion.

21. The protocol of claim 1, further comprising sending a plurality of frames at a fixed period using data flooding, at least a portion of the data is sent in more than one frame.

22. The protocol of claim 1, the first and second synchronization components are configured together with other synchronization components in at least one of a star topology, a daisy-chain topology, and a loop topology.

23. The protocol of claim 20, the data is presented to host processors individually associated with the synchronization components simultaneously in all the synchronization components.

24. The protocol of claim 20, the synchronization components are configured in a star topology, and the data comprises direct data and multiplexed data.

25. The protocol of claim 20, the synchronization components are configured in a daisy-chain topology, and the data comprises direct data.

26. The protocol of claim 1, the frame comprises three flag bytes, a control byte, a data field, and two CRC bytes.

27. The protocol of claim 24, the data field comprises 6 32 bit words.

28. The protocol of claim 24, control byte comprises a sequence count, a multiplier overflow bit, and an LCM synch bit.

29. The protocol of claim 26, the data field comprises a multiplexed data portion, the multiplexed data portion comprises a portion of multiplexed data being sent in a plurality of frames, and the sequence count is indicative of the portion of the multiplexed data being sent in the current frame.

* * * * *